US012579821B2

(12) United States Patent
Zheng et al.

(10) Patent No.: US 12,579,821 B2
(45) Date of Patent: Mar. 17, 2026

(54) OBJECT DETECTION FOR AUTONOMOUS SYSTEMS AND APPLICATIONS

(71) Applicant: NVIDIA Corporation, Santa Clara, CA (US)

(72) Inventors: Yang Zheng, Thousand Oaks, CA (US); Trung Pham, Santa Clara, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 361 days.

(21) Appl. No.: 18/323,795

(22) Filed: May 25, 2023

(65) Prior Publication Data

US 2024/0282118 A1 Aug. 22, 2024

Related U.S. Application Data

(60) Provisional application No. 63/446,162, filed on Feb. 16, 2023.

(51) Int. Cl.

| | |
|---|---|
| ***G06V 20/58*** | (2022.01) |
| ***G06V 10/764*** | (2022.01) |
| ***G06V 10/774*** | (2022.01) |
| ***G06V 10/82*** | (2022.01) |
| ***G06V 20/56*** | (2022.01) |

(52) U.S. Cl.

CPC ............ *G06V 20/58* (2022.01); *G06V 10/764* (2022.01); *G06V 10/774* (2022.01); *G06V 10/82* (2022.01); *G06V 20/588* (2022.01)

(58) Field of Classification Search

None

See application file for complete search history.

(56) References Cited

U.S. PATENT DOCUMENTS

| | | | | |
|---|---|---|---|---|
| 10,885,698 | B2 | 1/2021 | Muthler et al. | |
| 2021/0157006 | A1* | 5/2021 | Sun | G01S 17/894 |

OTHER PUBLICATIONS

Carion, N., et al., "End-to-End Object Detection with Transformers", In European conference on computer vision, pp. 1-26 (May 28, 2020).

(Continued)

*Primary Examiner* — Leon Flores

(74) *Attorney, Agent, or Firm* — Freestone Intellectual Property Law PLLC; Wesley Horner

(57) ABSTRACT

In various examples, one or more object detectors may regress bounding polygons for detected objects in systems (e.g., autonomous or semi-autonomous driving systems and applications) that provide object awareness, object identification, object avoidance, and/or object localization. The object detector may determine regression data representing a regressed polygon associated with a given shape of a detected object represented by classification data determined from a scene. The object detector may determine regression data for different regressed angles between different pairs of successive vertices of the regressed polygon and regressed lengths of vectors from a regressed geometric center of the regressed polygon to vertices of the regressed polygon. The object detector may generate, based at least in part on the regression data, a bounding shape for a detected object in the scene. In some embodiments, the object detector may be trained by deforming a regressed polygon to match a ground truth polygon.

20 Claims, 15 Drawing Sheets

(56) References Cited

OTHER PUBLICATIONS

He, K., et al., "Mask R-CNN", In Proceedings of the IEEE International Conference on Computer Vision (ICCV), pp. 2961-2969 (2017).
Lin, T., Y., et al., "Feature Pyramid Networks for Object Detection", In Proceedings of the IEEE Conference on Computer Vision and Pattern Recognition (CVPR), pp. 2117-2125 (2017).
Redmon, J., and Farhadi, A., "YOLO9000: Better, Faster, Stronger", In Proceedings of the IEEE Conference on Computer Vision and Pattern Recognition (CVPR), pp. 7263-7271 (2017).
Riaz, H., U., M., et al., "FourierNet: Compact Mask Representation for Instance Segmentation Using Differentiable Shape Decoders", In 25th International Conference on Pattern Recognition (ICPR), pp. 1-8 (Oct. 19, 2020).
Xie, E., et al., "PolarMask: Single Shot Instance Segmentation with Polar Representation", In Proceedings of the IEEE/CVF Conference on Computer Vision and Pattern Recognition (CVPR), pp. 12193-12202 (2020).
Zhou, X., et al., "Bottom-up Object Detection by Grouping Extreme and Center Points", In Proceedings of the IEEE/CVF Conference on Computer Vision and Pattern Recognition (CVPR), pp. 850-859 (2019).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
Chen, H., et al., "BlendMask: Top-Down Meets Bottom-Up for Instance Segmentation", In Proceedings of the IEEE/CVF Conference on Computer Vision and Pattern Recognition (CVPR), pp. 8573-8581 (2020).
Huang, R., et al., "YOLO-LITE: A Real-Time Object Detection Algorithm Optimized for Non-GPU Computers", In IEEE International Conference on Big Data (Big Data), pp. 1-8 (Nov. 14, 2018).
Lin, T., Y., et al., "Focal Loss for Dense Object Detection", In Proceedings of the IEEE International Conference on Computer Vision (ICCV), pp. 2980-2988 (2017).
Redmon, J., and Farhadi, A., "YOLOv3: An Incremental Improvement", arXiv:1804.02767v1, pp. 1-6 (Apr. 8, 2018).
Tian, Z., et al., "Conditional Convolutions for Instance Segmentation", In European Conference on Computer Vision, pp. 18 (Jul. 26, 2020).
Xu, W., et al., "Explicit Shape Encoding for Real-Time Instance Segmentation", In Proceedings of the IEEE/CVF International Conference on Computer Vision, pp. 5168-5177 (2019).
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Bochkovskiy, A., et al., "YOLOv4: Optimal Speed and Accuracy of Object Detection", arXiv:2004.10934v1, pp. 1-17 (Apr. 23, 2020).
Cordts, M., et al., "The Cityscapes Dataset", In CVPR Workshop on the Future of Datasets in Vision, vol. 2, pp. 1-4 (2015).
Hurtik, P., et al., "Poly-YOLO: Higher Speed, More Precise Detection and Instance Segmentation for YOLOV3", Neural Computing and Applications, arXiv:2005.13243v2, pp. 1-18 (May 29, 2020).
Liu, W., et al., "SSD: Single Shot MultiBox Detector", In European conference on computer vision, Springer, pp. 21-37 (2016).
Ren, S., et al., "Faster R-CNN: Towards Real-Time Object Detection with Region Proposal Networks", Advances in Neural Information Processing Systems 28 (NIPS), pp. 1-9 (2015).
Tian, Z., et al., "FCOS: Fully Convolutional One-Stage Object Detection", In Proceedings of the IEEE/CVF International Conference on Computer Vision (ICCV), pp. 9627-9636 (2019).
Zhang, Y., et al., "Deep Set Prediction Networks", 33rd Conference on Neural Information Processing Systems (NeurIPS), pp. 1-11 (2019).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
Bolya, D., et al., "YOLACT: Real-time Instance Segmentation", In Proceedings of the IEEE/CVF International Conference on Computer Vision (ICCV), pp. 9157-9166 (2019).
Duan, K., et al., "CenterNet: Keypoint Triplets for Object Detection", In Proceedings of the IEEE/CVF International Conference on Computer Vision (ICCV), pp. 6569-6578 (2019).
Kass, M., et al., "Snakes: Active Contour Models", International Journal of Computer Vision, pp. 321-331 (1988).
Redmon, J., et al., "You Only Look Once: Unified, Real-Time Object Detection", Proceedings of the IEEE Conference on Computer Vision and Pattern Recognition (CVPR), pp. 779-788 (2016).
Rezatofighi, H., et al., "Learn to Predict Sets Using Feed-Forward Neural Networks", IEEE Transactions on Pattern Analysis and Machine Intelligence, arXiv:2001.11845, vol. 44, Issue 12, pp. 9011-9025 (Oct. 25, 2021).
Wang, Y., et al., "CenterMask: single shot instance segmentation with point representation", In Proceedings of the IEEE/CVF Conference on Computer Vision and Pattern Recognition (CVPR), pp. 9313-9321 (2020).
Zhou, X., et al., "Objects as Points", arXiv: 1904.07850v2, pp. 1-12 (Apr. 25, 2019).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

* cited by examiner

500

RECEIVE SENSOR DATA FOR DETECTING AN OBJECT
B502

DETERMINE CLASSIFICATION DATA REPRESENTING
ONE OR MORE CLASSIFICATIONS
B504

DETERMINE REGRESSION DATA REPRESENTING A
REGRESSED ANGLE BETWEEN VERTICES OF A
REGRESSED POLYGON AND DETERMINE LENGTHS OF
VECTORS FROM AN OFFSET CENTER TO THE VERTICES
B506

GENERATE ONE OR MORE BOUNDING SHAPES OF A
DETECTED OBJECT
B508

PERFORM ONE OR MORE OPERATIONS BASED ON
THE ONE OR MORE BOUNDING SHAPES
B510

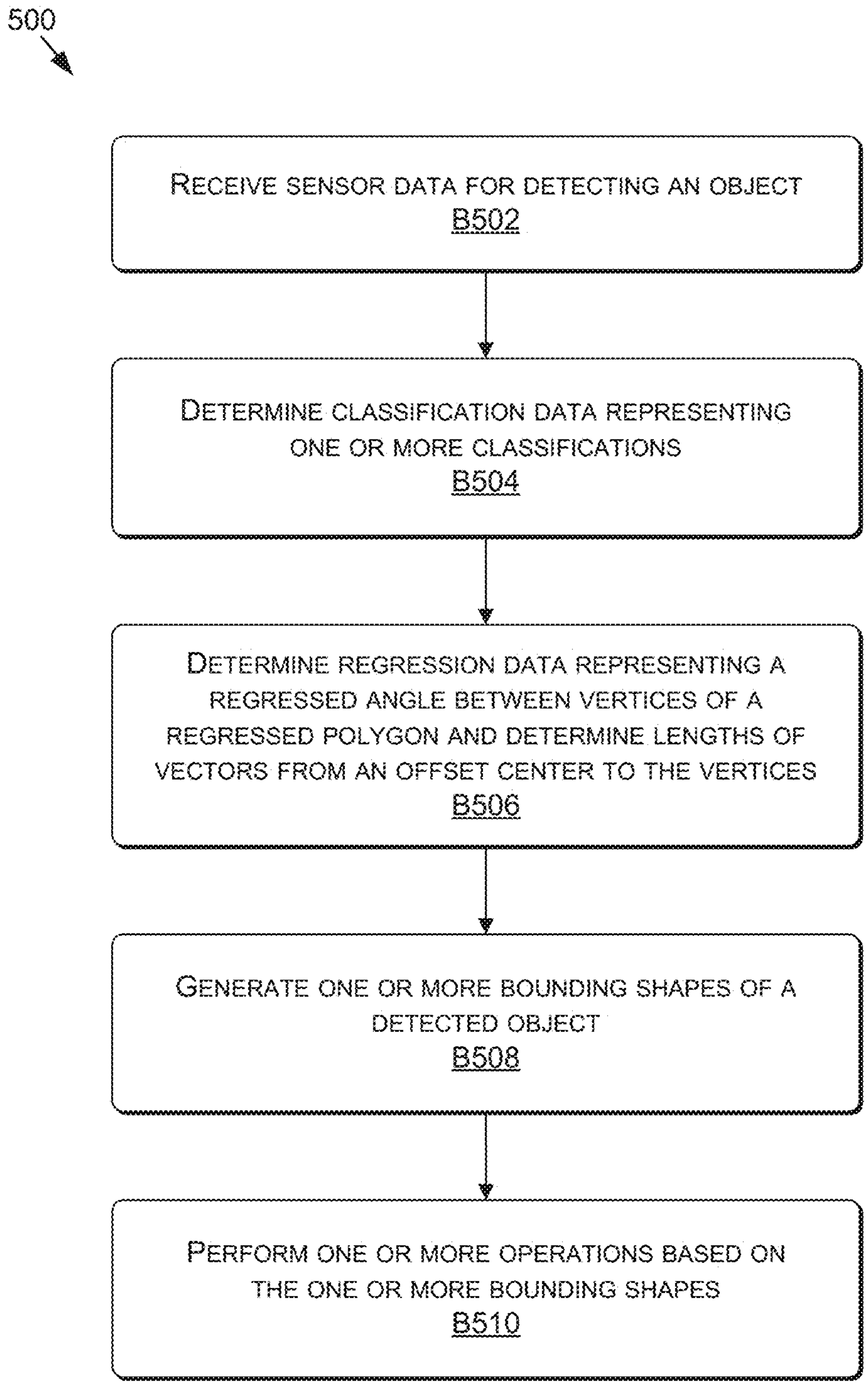

RECEIVE SENSOR DATA FOR DETECTING AN OBJECT
B802

GENERATE, USING ONE OR MORE NEURAL NETWORKS, ONE OR MORE REGRESSED POLYGONS REPRESENTED IN THE SENSOR DATA
B804

TRAIN THE ONE OR MORE NEURAL NETWORKS BASED AT LEAST ON DEFORMING ONE OR MORE REGRESSED POLYGONS TO ONE OR MORE CORRESPONDING GROUND TRUTH POLYGONS
B806

OBJECT DETECTION FOR AUTONOMOUS SYSTEMS AND APPLICATIONS

CROSS-REFERENCE TO RELATED APPLICATIONS

This application claims the benefit of U.S. Provisional Application No. 63/446,162 filed on Feb. 16, 2023, the contents of which are hereby incorporated by reference in their entirety.

BACKGROUND

Object detection has a variety of applications and is a central aspect of autonomous and semi-autonomous systems and applications. Detecting objects in an operating environment allows an autonomous or semi-autonomous machine or system to generate an understanding of its surrounding environment—such as to determine locations, shapes, and/or sizes of static and/or dynamic actors, objects, and/or environmental parts or features. Accurate object identification is very important for various autonomous or semi-autonomous system functionality, such as detecting and avoiding obstacles, or recognizing and responding to different types of road signs (e.g., an identified "STOP" sign will be treated differently from an identified "YIELD" sign). Moreover, precise motion planning for the system may depend on accurate detection and localization of objects, obstacles, and/or environmental parts or features. For example, an autonomous driving vehicle or machine may not stop appropriately at a street crosswalk if portions of the crosswalk are not identified and/or localized properly or with sufficient accuracy or precision.

Traditional or prior object detection methods and systems use one or more approaches that produce less-than-accurate detection results or that are computationally expensive for use in (near) real-time and/or mobile systems. In some systems, rectangular bounding boxes are used for object detection, but such bounding boxes often omit or over-predict the shape and/or location of an object. For example, portions of a crosswalk may be inadvertently omitted from a detected bounding box, allowing an autonomous vehicle to improperly pass through part of the crosswalk before stopping, or the shape or location of the crosswalk may be over-predicted such that the crosswalk is identified as larger than actual size, causing an autonomous vehicle to stop prematurely.

To account for this, some systems use ground truth polygons represented in polar coordinates that may be approximated by vectors with varying distance values but separated by evenly-spaced angular values. A task for such systems involves training a network to regress radius vectors for each object together with the predefined uniformly-spaced emitted rays decoded back to the polygon. A limitation of this method is that the quality of ground truth labels (and thus the quality of prediction) is bounded by the number of rays. That is, owing to the evenly angular spacing of the rays, portions of a detected object may be under or over predicted (e.g., a detected region of an object may be larger or smaller than the ground truth region of the object). In another conventional technique, objects may be detected via instance segmentation where pixel-level labels for detected objects are generated. However, such pixel-level labeling is computationally expensive, and thus, use of such a technique can be particularly challenging for (near) real-time and/or mobile systems and applications such as autonomous or semi-autonomous machines and systems (e.g., autonomous driving systems) where processor and memory requirements are demanding.

As such, conventional or prior object detection systems and methods have limited and/or computationally expensive functionality and accuracy. For autonomous systems and applications, these limitations can negatively impact detection speed, detection accuracy, and/or detection precision, which can interfere with or limit the safe and efficient navigation and movement of autonomous or semi-autonomous systems (e.g., autonomous driving vehicles) through environments rich in objects of varying sizes, shapes, and locations.

SUMMARY

Embodiments of the present disclosure relate to object detection for autonomous or semi-autonomous systems and applications. Systems and methods are disclosed for detecting bounding polygons for detected objects in systems that provide object awareness, object identification, object avoidance, and/or object localization, such as autonomous or semi-autonomous systems and applications.

In contrast to conventional systems, such as those described above, in some embodiments, an object detector may be used to detect objects using polygon shapes by predicting, for each individual object, a representation of a set of vertices that represent a bounding polygon, where the number of vertices for a predicted bounding polygon is not fixed and therefore may vary from prediction to prediction. For example, individual vertices may be represented by a vector (e.g., a ray) starting at an origin point in a given object and having a pair of regressed values representing a predicted angle between adjacent vertices and distance (or length) from the origin (e.g., in a polar coordinate system) to the individual vertex. Due to the relatively small and flexible number of vertices that may be predicted, inference latency may be reduced over prior techniques, thereby enabling substantial improvements in prediction and/or perception time in real-time or near real-time applications.

In some embodiments, to facilitate training a DNN to regress polygons using a variable number of vertices, predicted polygons and/or ground truth polygons may be deformed into a corresponding representation that uses a common or comparable structure (e.g., such that predicted and ground truth polygons have a common number of vertices and/or angular offset between vertices), prior to comparison and backpropagation. Depending on the implementation, predicted polygons may be deformed to ground truth polygons, or both may be deformed to have a common or comparable structure.

As such, the systems and methods described herein are able to represent object shapes more accurately by using regressed polygons without many of the drawbacks associated with conventional bounding box or polygon object detections systems.

BRIEF DESCRIPTION OF THE DRAWINGS

The present systems and methods for object detection using polygons for autonomous and semi-autonomous systems and applications are described in detail below with reference to the attached drawing figures, wherein:

FIG. 5 is a data flow diagram illustrating an example process for object detection, using polygon regression, in accordance with some embodiments of the present disclosure;

DETAILED DESCRIPTION

Figure 1:
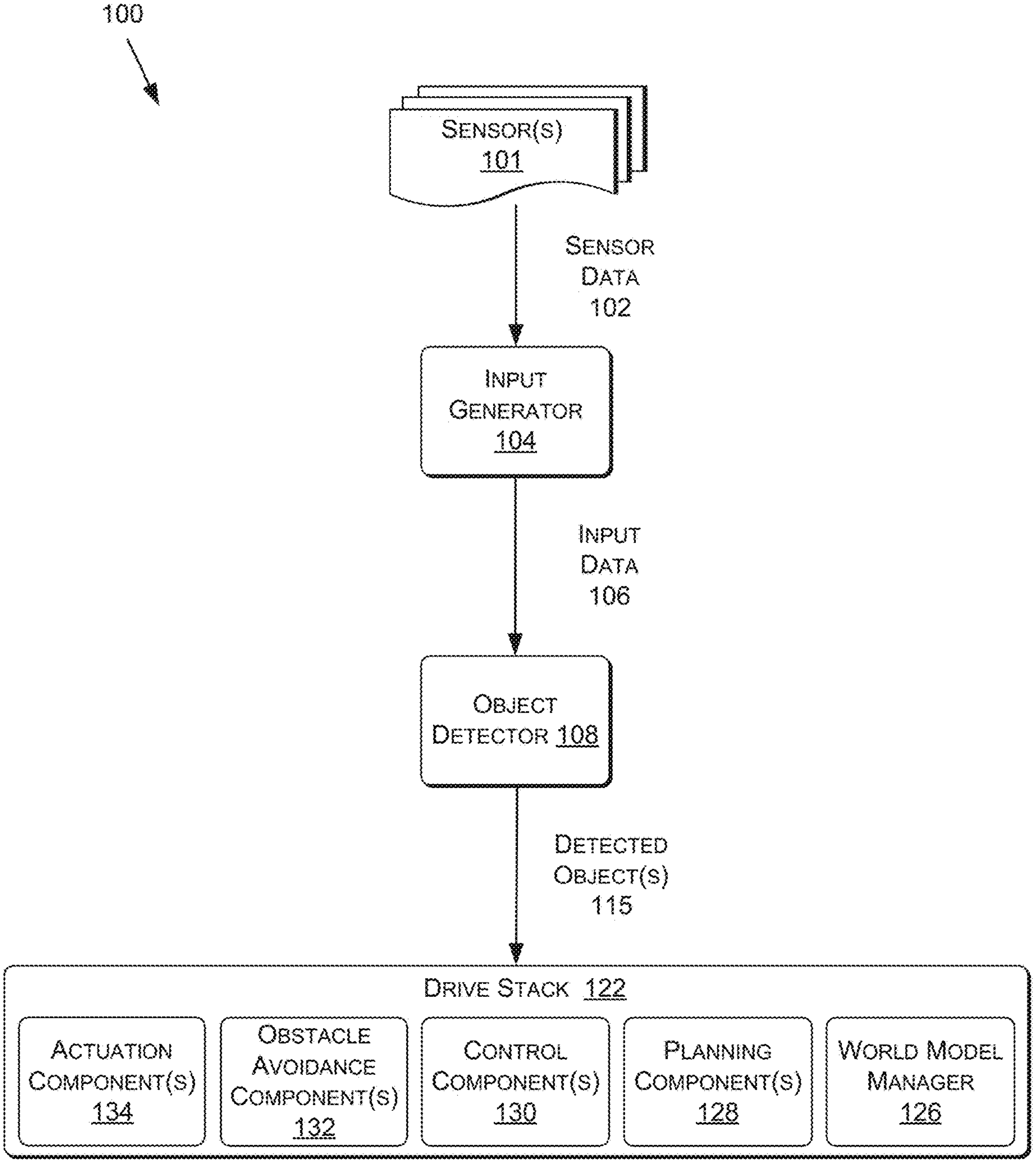
FIG. 1 is a data flow diagram illustrating an example data flow through an example polygon regression system, in accordance with some embodiments of the present disclosure.

Systems and methods are disclosed relating to object detection using polygons for semi-autonomous and autonomous systems and applications. For example, systems and methods are disclosed that predict a representation of a bounding polygon for an object by regressing a variable number of vertices (e.g., represented by distances to vertices and angles between adjacent vertices). The present techniques may be used to detect bounding polygons for detected objects in systems that provide object awareness, object identification, object avoidance, and/or object localization, such as autonomous or semi-autonomous systems and applications. Although the present disclosure may be described with respect to an example autonomous or semi-autonomous vehicle or machine 1000 (alternatively referred to herein as "vehicle 1000" or "ego-machine 1000," an example of which is described with respect to FIGS. 10A-10D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where object detection, localization, and/or navigation may be used.

At a high level, an object detector may be used to detect objects using polygon shapes. According to some embodiments, the object detector may include a deep neural network (DNN)—such as a Deformable Polar Polygon Object Detection (DPPD) network. In particular, one or more DNNs may be used to predict, for each individual object, a representation of a set of vertices that represent a bounding polygon, where the number of vertices for a predicted bounding polygon is not fixed and therefore may vary from prediction to prediction. For example, individual vertices may be represented by a vector (e.g., a ray) starting at an origin point in a given object and having a pair of regressed values representing a predicted angle between adjacent vertices and distance (or length) from the origin (e.g., in a polar coordinate system) to the individual vertex. Due to the relatively small and flexible number of vertices that may be predicted, inference latency may be reduced over prior techniques, thereby enabling substantial improvements in prediction and/or perception time in real-time or near real-time applications.

In some embodiments, to facilitate training a DNN to regress polygons using a variable number of vertices, predicted polygons and/or ground truth polygons may be deformed into a corresponding representation that uses a common or comparable structure (e.g., such that predicted and ground truth polygons have a common number of vertices and/or angular offset between vertices), prior to comparison and backpropagation. Depending on the implementation, predicted polygons may be deformed to ground truth polygons, or both may be deformed to have a common or comparable structure.

For example, to account for a difference in the number of vertices between a ground truth polygon and a predicted polygon, ground truth and predicted polygon vertices may be densely resampled until both have the same number of vertices and the same angular offsets between vectors or rays emanating from their respective origins (e.g., the origin of the ground truth polygon and a regressed origin of a predicted polygon). That is, a predicted polygon may be deformed until it has the same number of vertices and angular offsets between vectors as the ground truth polygon. This resampling operation may be fully differentiable, allowing for gradient back-propagation. Using sparse polygon prediction in this way ensures high-speed runtime inference, while dense resampling during training allows the DNN to learn more precise object shapes with high precision. As such, this resampling process may be repetitively executed to facilitate a loss computation between the deformed predicted polygon and an associated ground truth polygon (e.g., selected from a plurality of ground truth polygons using a matching algorithm such as the Hungarian algorithm to match a predicted polygon with a ground truth polygon) to facilitate iteratively training the system and method to predict the shape of a target object. In some embodiments, this resampling is not performed during inference, which allows for object detection using polygon regression in a high speed and lower computational cost manner.

The systems and methods of the present disclosure may use an anchor-free and/or non-maximum suppression (NMS)-free set prediction approach due to the simplicity, training, and inference efficiency of this approach. For example, a DNN may include a classification head that predicts classification data representing a likelihood that each pixel or cell belongs to a particular class, and a regression head that regresses a representation of a bounding polygon for a detected object (e.g., anchored at a regressed location). The regression head may predict a representation of a set of starting polygon candidates (e.g., one for each pixel or cell of an output grid, where each pixel or cell corresponds to a depth-wise vector that regresses a representation of a corresponding polygon candidate). During training, the candidates may be matched with corresponding ground truth polygons using a matching algorithm (e.g., the Hungarian matching algorithm) resulting in a number of pairs of prediction-ground truth polygon assignments. That is, according to some embodiments, a matching algorithm, such as the Hungarian matching algorithm, uses classification costs that represent the degree of accuracy to which a classification matches a given object class and regression costs that represent a measure of how close a predicted polygon matches a given ground truth polygon to make predicted polygon to ground truth polygon pairing assignments. As such, the Hungarian matching algorithm may be used to generate assignment pairs that minimize one or more costs (e.g., classification costs, regression costs, etc.) associated with pairing two candidates (in this case, a predicted regressed polygon with a ground truth polygon). Classification and regression losses from these matches may be used, and for unmatched candidates, classification loss may be used.

As such, the techniques described herein may be used to detect instances of animate and/or inanimate objects and/or parts or features of an environment, and these detections (and classifications) may be provided to an autonomous or semi-autonomous vehicle drive stack to enable safe path planning and control of the semi-autonomous or autonomous vehicle or machine. More generally, aspects of the present disclosure may be used to detect, identify, and/or localize a given object in a way that speeds up detection time, improves detection precision, and/or reduces computational cost over prior techniques.

With reference to FIG. 1, FIG. 1 is a data flow diagram illustrating an example data flow through an example polygon regression system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous or semi-autonomous vehicle or machine 1000 of FIGS. 10A-10D, example computing device 1100 of FIG. 11, and/or example data center 1000 of FIG. 10.

At a high level, the polygon regression system 100 may include an object detector 108, which may include one or more machine learning models or networks (e.g., a deep neural network (DNN)) configured to detect various objects represented by sensor data 102 (or sensor data representations thereof, such as images, point clouds, projection images, orthogonally project images, range images, etc.) of a three-dimensional (3D) environment. The sensor data 102 (e.g., corresponding to an image) may be captured using one or more sensor(s) 101 (e.g., a camera), and the sensor data 102 may be used as the input data 106 into the object detector 108. In the embodiment illustrated in FIG. 1, the sensor data 102 may be processed by an input generator 104 into input data 106 that has a format that the object detector 108 may be configured to accept and process (e.g., a projection of some other type of sensor data 102, such as LiDAR or RADAR data). The input data 106 may be fed into the object detector 108 to detect one more object(s) 115 in the 3D environment.

In some embodiments, object detection may be performed using sensor data 102 from any number and/or any type of sensor, such as, without limitation, one or more cameras, LiDAR sensors, RADAR sensors, ultrasonic sensors, and/or other sensor types such as those described below with respect to the autonomous or semi-autonomous vehicle 1000. For example, the sensor(s) 101 may include one or more sensor(s) 101 of an ego-machine—such as LiDAR sensor(s) 1064 of the autonomous vehicle 1000—and the sensor(s) 101 may be used to generate sensor data 102 that represents objects in the 3D environment around the ego-machine. Taking LiDAR (light detection and ranging or laser imaging, detection and ranging) data as an example, object detection may be performed using LiDAR data (e.g., sensor data 102) from one or more LiDAR sensors (e.g., sensor(s) 101). Generally, a LiDAR system may include a transmitter that emits pulses of laser light. The emitted light waves reflect off of certain objects and materials, and one of the LiDAR sensors may detect these reflections and reflection characteristics such as bearing, azimuth, elevation, range (e.g., time of beam flight), intensity, reflectivity, signal-to-noise ratio (SNR), and/or the like. Reflections and reflection characteristics may depend on the objects in the environment, speeds, materials, sensor mounting position and orientation, etc. Firmware associated with the LiDAR sensor(s) may be used to control LiDAR sensor(s) to capture and/or process the sensor data 102, such as reflection data from the sensor's field of view.

Generally, the sensor data 102 may include raw sensor data, LiDAR point cloud data, and/or reflection data processed into some other format. For example, reflection data may be combined with position and orientation data (e.g., from GNSS and IMU sensors) to form a point cloud representing detected reflections from the environment. Each detection in the point cloud may include a three-dimensional location of the detection and metadata about the detection such as one or more of the reflection characteristics. Although some embodiments describe the sensor data 102 as LiDAR data, the sensor data 102 may additionally or alternatively include sensor data from other types of sensors, such as RADAR data (e.g., RADAR point clouds), image data (e.g., RBG images from one or more cameras mounted around an ego-machine), ultrasonic data, and/or other types.

In some embodiments in which object detection is applied to image data, the sensor data 102 (e.g., one or more images from one or more cameras) may be applied to the object detector 108. However, in some embodiments, the input generator 104 may process the sensor data 102 into some other format that the object detector 108 accepts (e.g., the input data 106). For example, in some embodiments in which the sensor data 102 includes a representation of measured 3D points (e.g., LiDAR or RADAR point clouds), the input generator 104 may accumulate the measured 3D points (and/or other data) (e.g., over a designated number of time slices, LiDAR or RADAR spins, etc.), transform the measured 3D points to a single coordinate system (e.g., centered around an origin of a rig coordinate system of the ego-machine), ego-motion-compensate the measured 3D points (e.g., to a latest known position of the ego-machine), and/or project the measured 3D points to form a projection image representing any suitable view of the 3D environment (e.g., perspective, orthographic), having any number of channels (e.g., a single channel image, a multi-channel image or tensor) representing any characteristic of the sensor data 102 (e.g., projected position of a measured 3D point, one or more reflection characteristics, image data such as pixel color, etc.). For example, an (accumulated, ego-motion-compensated) LiDAR point cloud may be projected to form a LiDAR range image with a perspective view or a top-down representation of projected 3D locations of measured 3D points (e.g., a height map), with any number of channels (e.g., storing intensity, elevation or range profile, etc.).

In some embodiments, different sensor(s) 101 (whether the same type or a different of sensor) may be used to generate different modalities of sensor data 102 (e.g., LiDAR range images, camera images, etc.) having the same (e.g., perspective) view of the 3D environment in a common image space, and sensor data 102 from the different sensors 101 and/or sensor modalities may be stored in different channels of a multi-channel image or tensor. These are meant simply as examples, and other variations are contemplated within the scope of the present disclosure.

At a high level, the object detector 108 may detect objects such as instances of obstacles, static parts of the environment, and/or other objects represented in the input data 106 (e.g., one or more camera image(s) and/or other sensor data, optionally stacked into corresponding channels of an input tensor). For example, the object detector 108 may include one or more machine learning model(s) (e.g., one or more DNNs) which may extract classification data (e.g., class confidence data for any number of classes and/or corresponding channels) and/or object instance data (e.g., a representation of a bounding polygon anchored at a regressed location) for each detected object in the 3D environment. The classification data and object instance data may be post-processed to generate class labels and 2D and/or 3D bounding boxes, closed polylines, or other bounding shapes identifying the locations, geometry, and/or orientations of the detected object instances.

In some embodiments, the object detector 108 may be implemented using a DNN, such as a convolutional neural network (CNN). Although certain embodiments are described with the object detector 108 being implemented using neural network(s), this is not intended to be limiting. For example, and without limitation, the object detector 108 may include any type of a number of different networks or machine learning models, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, transformer, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the object detector 108 may include a common trunk (or stream of layers) with several heads (or at least partially discrete streams of layers) for predicting different outputs based on the input data 106. For example, the object detector 108 may include, without limitation, a feature extractor (e.g., a DNN, an encoder/decoder, etc.) including convolutional layers, pooling layers, and/or other layer types, where the output of the feature extractor may be provided as input to a first head (a classification head) for predicting classification data and a second head (a regression head) for predicting location, geometry, and/or orientation of detected objects. The first head and the second head may receive parallel inputs, in some examples, and thus may produce different outputs from similar input data.

Figure 2:
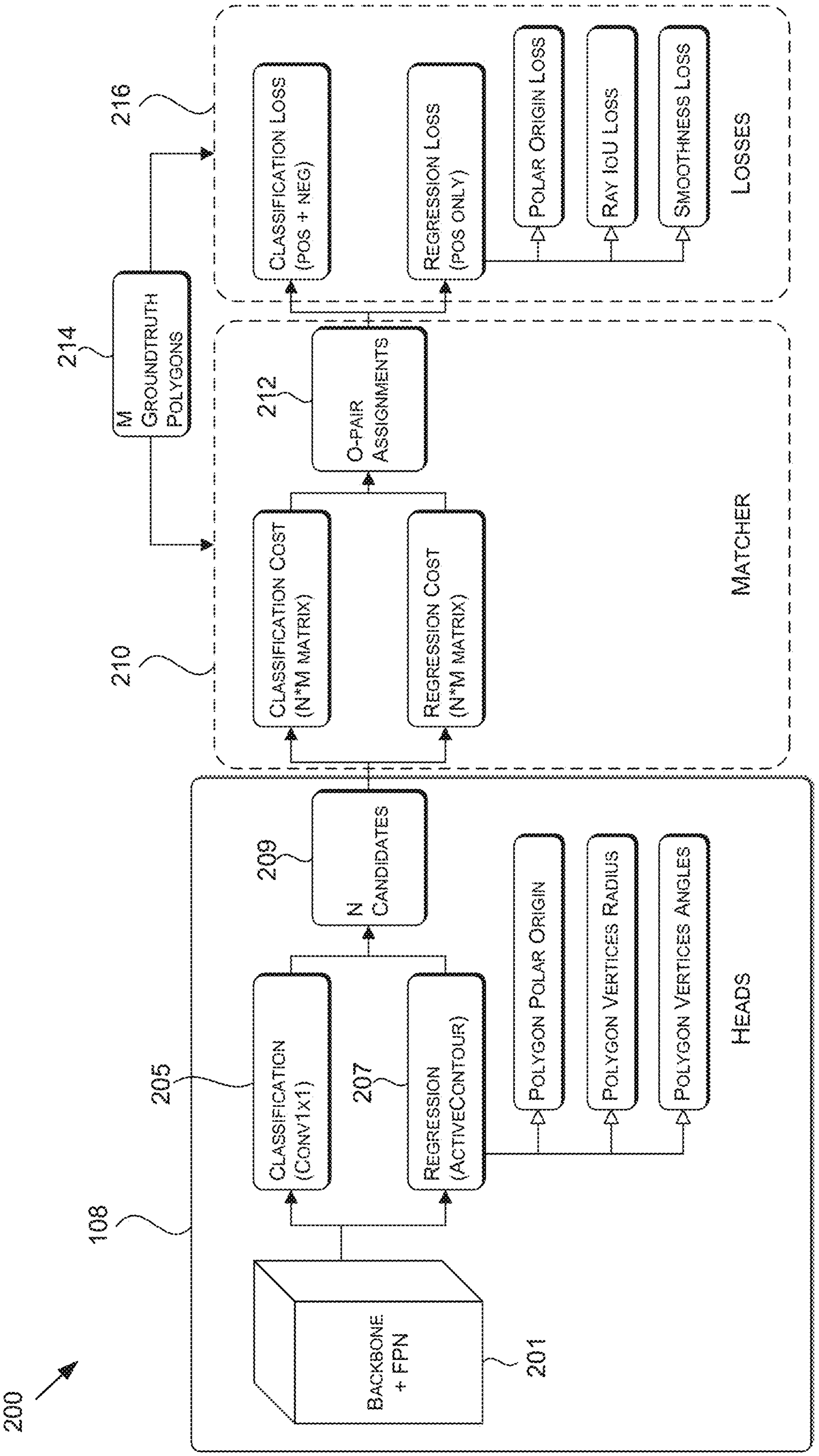
FIG. 2 is a data flow diagram illustrating an example network architecture of an object detector and training pipeline for object detection using polygon regression, in accordance with some embodiments of the present disclosure.

Referring now to FIG. 2, FIG. 2 is a data flow diagram illustrating an example network architecture 200 of an object detector 108 and training pipeline for object detection using polygon regression in accordance with some embodiments of the present disclosure. The object detector 108 (which may correspond with the object detector 108 of FIG. 1) may detect objects using polygon shapes, for example, by regressing a bounding or fitted shape. According to an embodiment, the object detector 108 may include a Deformable Polar Polygon Object Detection method and system (DPPD) (e.g., a type of deep neural network (DNN)). For example, the object detector 108 may predict a representation of each individual object (e.g., of one or more supported classes) appearing in an image or other sensor data. The predicted representation of a detected object instance may take the form of a sparse and flexible set of vertices that may be used to construct a polygon that represents the shape of the detected object, where individual vertices may be represented using a pair of regressed angle and regressed distance (or length) in the Polar coordinate system (although, in embodiments, Cartesian or other coordinate systems may be used without departing from the scope of the present disclosure). In some embodiments, the object detector 108 may regress a polygon shape anchored to a regressed location relative to each pixel, and therefore may be considered anchor-free. Additionally or alternatively, the object detector 108 may learn to suppress duplicate instances and therefore may be considered NMS-free.

Figure 3:
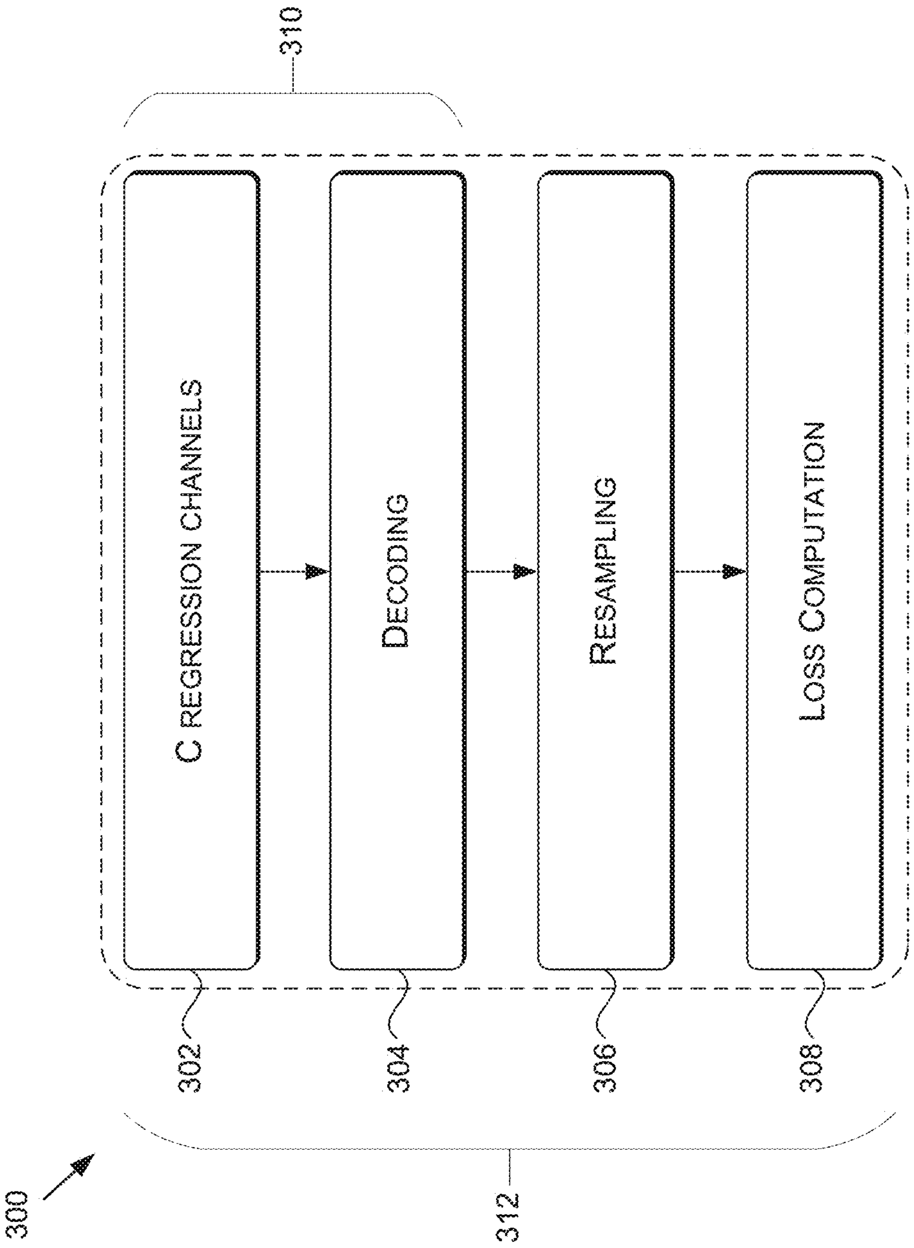
FIG. 3 is a data flow diagram illustrating an example process for object detection using polygon regression, in accordance with some embodiments of the present disclosure.
Figure 4:
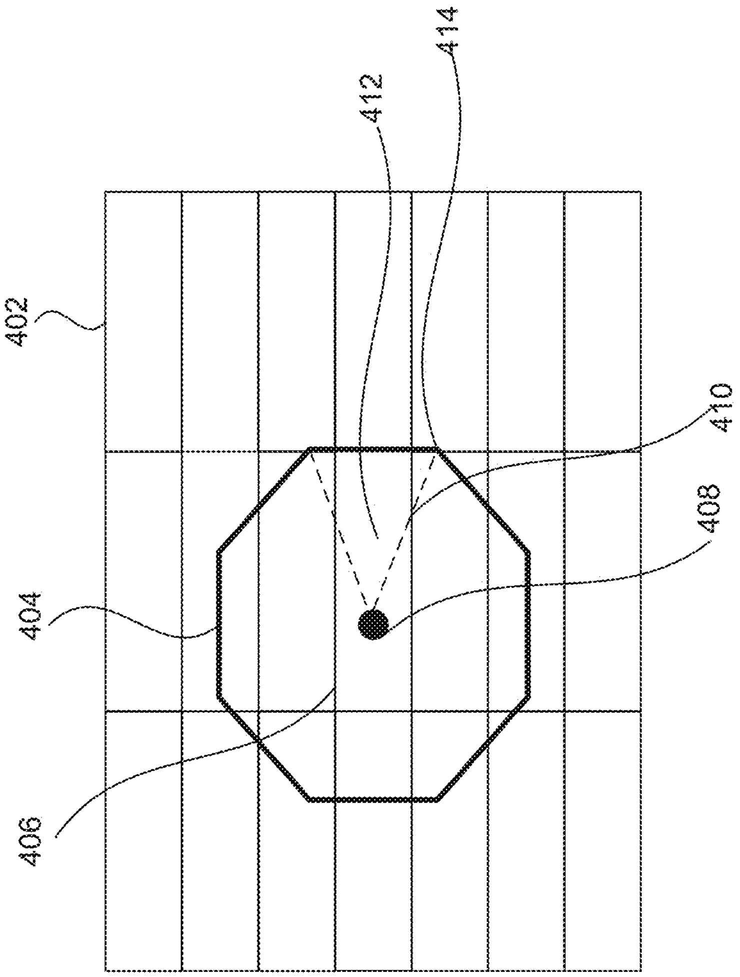
FIG. 4 is an illustration of a portion of a grid of regressed polygon data, in accordance with some embodiments of the present disclosure.

With continuing reference to FIG. 2 and with reference to FIGS. 3 and 4, a classification head 205 and a regression head 207 may follow a network backbone and feature pyramid network (FPN) 202. In some embodiments, the classification head 205 of the object detector 108 may include any number of channels that each predict a classification data (e.g., a classification map for each channel) representing a likelihood that each pixel or cell belongs to a particular class represented by the channel, and the regression head 207 of the object detector 108 may include any number of channels (e.g., a set corresponding to each supported class) that each regress a different characteristic of regressed polygons representing candidate detected objects of a corresponding class. Generally, the depth-wise vector predicted for each pixel or cell (e.g., for the set of channels associated with a particular class) may define a different candidate polygon (and candidate detected object). In operation, the classification data predicted for a particular class may be thresholded to identify pixels or cells having more than a threshold likelihood of representing a detected object (e.g., belonging to or pointing to a detected object), and the depth-wise vector predicted by the regression head 207 for a corresponding pixel or cell may be extracted and decoded to identify the regressed polygon representing the shape of the detected object. According to some embodiments, the classification head 205 may include a simple 1×1 convolution layer with a sigmoid activation (e.g., for each of one or more channels that predict classification data for a corresponding supported class). The regression head 207 may contain separate 1×1 convolution layers to predict, for each pixel or cell, a polygon center (e.g., dx/dy vector pointing to a regressed center of a candidate polygon for a detected object represented by the pixel or cell, such that the center may serve as a polar origin), polygon vertices (e.g., polar angles and/or radii for the candidate polygon), and/or other characteristics of a regressed bounding polygon for a candidate polygon for a detected object represented by the pixel or cell.

FIG. 3 is a data flow diagram illustrating an example inference and training process 300 for the object detector 108 illustrated in FIGS. 1 and 2. At a high level, (e.g., the C regression channels 302 of) the object detector 108 may be run at inference 310 to generate an encoded representation of fitted polygons for one or more instances of detected objects, and the encoded representation of the fitted polygons may be decoded 304. For training 312, the process 300 may further involve resampling 306 the decoded polygons to corresponding ground truth polygons, comparing the resampled polygons using a loss computation 308, and updating the object detector 108, as explained in more detail below.

More specifically, given an FPN feature map, the number of regression channels C (302) (e.g., the number of channels in the regression head 207 of FIG. 2) may be set to C=2+2*K, where K (e.g., K=12) denotes the number of predictable vertices per polygon. The vertices may be represented in polar coordinates, which may have the advantage of organizing the contouring order. Therefore, in an example embodiment, each predicted candidate polygon may be represented by 2+2*K regression parameters, 2 for the polygon center (e.g., polar origin) coordinates (x, y), K for each vertex's radius, and K for the angles between successive vertices.

In some embodiments, the number of vectors or rays emanating from the polar origin to each of the one or more vertices may be a predefined hyper-parameter, such that each vertex may have only one degree of freedom (DoF) to optimize via regression (e.g., radius). According to some embodiments, however, the object detector 108 predicts both radius (radii) and angles between successive vertices, allowing each vertex to have two DoFs.

As illustrated in FIG. 3, for a given polygon represented by a particular pixel or cell, a decoding process 304 may be used to parse a (2+2*K) dimensional tensor to extract the corresponding predicted polygon polar origin, vertices radius, and vertices angles, denoted as $[o_x, o_y, r_0, \ldots, r_{K-1}, a^0, \ldots, a^{K-1}]$.

By way of illustration, FIG. 4 illustrates a portion of a grid 402 of regressed polygon data (e.g., generated by the regression head 207 of FIG. 2), in accordance with some embodiments of the present disclosure. For example, assume the grid 402 corresponds to a portion of an input image that contains an object such as a street sign (e.g., a stop sign 404). The resolution of the grid 402 may or may not correspond to the resolution of the input image, so the number of input pixels (or cells) (in the input image) may or may not correspond to the number of output pixels (or cells) represented by the regressed polygon data. In the example illustrated in FIG. 4, each grid cell (e.g., cell 406) may be associated with a depth-wise vector that regresses a representation of a corresponding candidate polygon. Different dimensions of the depth-wise vector may encode different regressed values representing (e.g., different key points of) the candidate polygon. For example, the object detector 108 may regress a polar origin 408 location (see FIG. 4) for a detected polygon 404 by regressing offsets between a reference location in each grid cell (e.g., a corner, a center point) and a corresponding polygon center in the depth-wise vector. As illustrated in FIG. 4, the center 408 of the example stop sign 404 is located at a regressed offset from bottom left corner of the cell 406, so the regressed polygon data for that cell may include one or more floating point values that represent that offset (e.g., dx, dy). Vectors or rays 410 are illustrated as originating from the polar origin 408 positioned at the regressed offset, extending to vertices 414, and having an angular offset 412 between the vectors or rays 410. In some embodiments, every grid cell 406 of the grid 402 yields a key point candidate, and offsets may be predicted with respect the key point position. According to one embodiment, the polar origin decoding equation may include:

$$\begin{cases} o_x = g_x + s_x * \sigma(f_0) \\ o_y = g_y + s_y * \sigma(f_1) \end{cases}$$

where $(o_x, o_y)$ denotes the polygon polar origin coordinates, $(g_x, g_y)$ denotes the key point coordinates, and $(s_x, s_y)$ denotes the grid cell size. A sigmoid function $\sigma$ may be applied, for example, on the 0-th and 1-th channel of regression features f0 and f1, resulting in a 0 1 ratio within the cell.

According to embodiments, the next K features (f2, . . . , f1+K) of the depth-wise vector may be dedicated for the radius lengths 408 of the K vertices. The decoding function for the k-th radius may include:

$$r_k = \mu * e^{f_k}$$

where $\mu$ is a prior knowledge of the radius scale. An exponential activation $e^{f_k}$ may be applied to ensure the decoded radius length is always positive.

According to embodiments, the last K features (f2+K, . . . , f1+2K) of the depth-wise vector may correspond to the angles 412 between successive vertices of the K vertices. According to at least one embodiment, the angles may be encoded in counterclockwise order; therefore, the i-th positive delta angle may be decoded, the first k delta angles may be accumulated, and normalization may be performed to get the k-th angle in range [0, 2π]:

$$a_k = 2\pi * \frac{\sum_{i=0}^{k} e^{f_i}}{\sum_{i=0}^{K} e^{f_i}}$$

As such, the object detector 108 may serve to predict angle deltas, which are able to handle both small and large intervals. Although described as representing angles counterclockwise (e.g., relative to a positive x-axis extending through an origin of a polygon), this is not intended to be limiting. In some embodiments, the angles may be represented relative to a different axis, and/or in a different direction (e.g., clockwise). As should be appreciated, the order of encoded features illustrated and described above with reference to FIG. 4 are for purposes of example only and alternative orders may be utilized.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the method 500 may be described, by way of example, with respect to the object detection system of FIG. 1. However, this method may additionally or alternatively be executed by any one system, or any combination of systems, including, but not limited to, those described herein.

FIG. 5 is a data flow diagram illustrating an example process for object detection using polygon regression, in accordance with some embodiments of the present disclosure as described above with reference to FIGS. 1-3. For purposes of non-limiting example, FIG. 4 illustrates a grid (for an example street sign) where each cell 404 in the grid may include an initial point of origin for a given polygon shape anchored at a regressed X and Y offset from the associated cell to determine a polar origin 406, as described above.

According to some embodiments, the method 500, at block B502, includes receiving sensor data for detecting an object. For example, as described above with reference to FIG. 1, the sensor data 102 (e.g., an image) may be captured using one or more sensor(s) 101 (e.g., a camera), and the sensor data 102 (e.g., the image) may be used as the input data 106 into the object detector 108.

The method 500, at block B504, includes determining classification data representing one or more classifications. For example, as described above with reference to FIG. 2, the object detector 108 may include, without limitation, a feature extractor (e.g., a DNN, an encoder/decoder, etc.) including convolutional layers, pooling layers, and/or other layer types, where the output of the feature extractor may be provided as input to the classification head 205 for predicting classification data of detected objects.

The method 500, at block B506, includes determining regression data representing, for each regressed polygon of one or more regressed polygons representing one or more shapes of one or more detected objects represented by the one or more classifications in the scene, at least a regressed angle between vertices of the regressed polygon. For example, as described above with reference to FIG. 2, the object detector 108 may include, without limitation, a regression head 207 for predicting location, geometry, and/or orientation of detected objects. According to some embodiments, the regression data may represent different regressed angles 410 between different pairs of successive vertices 412 of each regressed polygon of the one or more regressed polygons. The regression data may further represent at least a regressed length of a vector 408 of one or more vectors from a regressed origin (i.e., geometric center) 406 of the regressed polygon to a corresponding one of the vertices 412. Regressed angles may be determined as (X and Y) angular offsets from the regressed origin 406 of each regressed polygon of the one or more regressed polygons. According to some embodiments, the regressed origin may be a geometric center of the regressed polygon located at a regressed offset from a corresponding cell 404 of the regression data representing the regressed polygon.

The method 500, at block B508, includes generating, by the object detector 108, based at least in part on the regression data, one or more bounding shapes of the one or more detected objects in the scene. For example, with respect to FIG. 3, the one or more bounding shapes may be generated based at least on decoding 310 predicted classification data and regressed polygon data, for example, with respect to FIG. 4, by selecting one or more cells of the classification data having a threshold classification value, identifying a corresponding depth-wise vector associated with a corresponding cell 404 of the regression data for each of the one or more cells, and optionally generating some representation of the polygon encoded by each depth-wise vector to generate a corresponding bounding shape.

The method 500, at block B510, includes performing one or more operations, such as object awareness, object identification, object avoidance, and/or object localization in autonomous systems and applications based at least on the one or more bounding shapes.

As such and returning to FIG. 1, the object detector 108 may identify detected object(s) 115 (e.g., detected people, street signs, vehicles, obstacles, landmarks, etc.). In some embodiments, positional values that are not already in 3D world coordinates may be converted to 3D world coordinates, and/or may be provided for use by the vehicle 1000 of FIGS. 10A-10D in performing one or more operations, such as localization, navigation, and/or others. For example, a representation of the detected object(s) 115 (e.g., a 3D point cloud, a 2D representation such as a projection image, corresponding labels) may be used by control component(s) of the vehicle 1000, such as an autonomous driving software stack 122 executing on one or more components of the vehicle 1000 of FIGS. 10A-10D (e.g., the SoC(s) 1004, the CPU(s) 1018, the GPU(s) 1020, etc.). For example, the vehicle 1000 may use this information (e.g., instances of obstacles) to localize its position in a map, to navigate, plan, or otherwise perform one or more operations (e.g., obstacle or protuberance avoidance, lane keeping, lane changing, merging, splitting, adapting a suspension system of the ego-machine to match the current road surface, applying an early acceleration or deceleration based on an approaching surface slope, mapping, etc.) within the environment.

In some embodiments, the detected object(s) 115 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle, or collision avoidance layer of the drive stack 122), actuation component(s) 134 (e.g., corresponding to an actuation layer of the drive stack 122), and/or other components corresponding to additional and/or alternative layers of the drive stack 122.

The sensor manager may manage and/or abstract sensor data from the sensors of the vehicle 1000. For example, and with reference to FIG. 10C, the sensor data may be generated (e.g., perpetually, at intervals, based on certain conditions) by the LIDAR sensor(s) 1064, the RADAR sensor(s) 1060, the ultrasonic sensor(s) 1062, the stereo camera(s) 1068, other camera(s), and/or other sensors). The sensor manager may receive the sensor data from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1000 may use the uniform format, thereby simplifying processing of the sensor data. In some examples, the sensor manager may use a uniform format to apply control back to the sensors of the vehicle 1000, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1200 is allowed to drive or is capable of driving (e.g., based on the location of the drivable or other navigable paths defined by avoiding detected obstacles in the environment and/or detected protuberances in the road surface), and how fast the vehicle 1200 can drive without colliding with an obstacle (e.g., an object, such as a structure, entity, vehicle, etc.) that is sensed by the sensors of the vehicle 1000.

The path perceiver may perform path perception, such as by perceiving nominal paths that are available in a particular situation. In some examples, the path perceiver may further take into account lane changes for path perception. A lane graph may represent the path or paths available to the vehicle 1000, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information. In some embodiments, the path perceiver may take into account the detected object(s) 115. For example, the path perceiver may evaluate a reconstructed 3D road surface to identify protuberances and include paths that avoid the protuberances.

The wait perceiver may be responsible to determining constraints on the vehicle 1000 as a result of rules, conventions, and/or practical considerations. For example, the rules, conventions, and/or practical considerations may be in relation to a 3D road surface, traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver. In some embodiments, the wait perceiver may take into account the detected object(s) 115. For example, the wait perceiver may evaluate a reconstructed 3D road surface to identify an approaching surface slope and determine to apply and/or apply an early acceleration or deceleration to accommodate the approaching surface slope. Additionally or alternatively, the wait perceiver may evaluate a reconstructed 3D road surface to identify a portion of an approaching road surface and determine to adapt and/or adapt a suspension system of the vehicle 1000 such that, once the vehicle 1000 reaches a corresponding portion of the road, the suspension system matches the identified road surface.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1000 of static or stationary infrastructure objects and obstacles. The map perceiver may also generate information for the wait perceiver and/or the path perceiver, for example, such as to determine which light at an intersection has to be green for the vehicle 1000 to take a particular path.

Figure 10A:
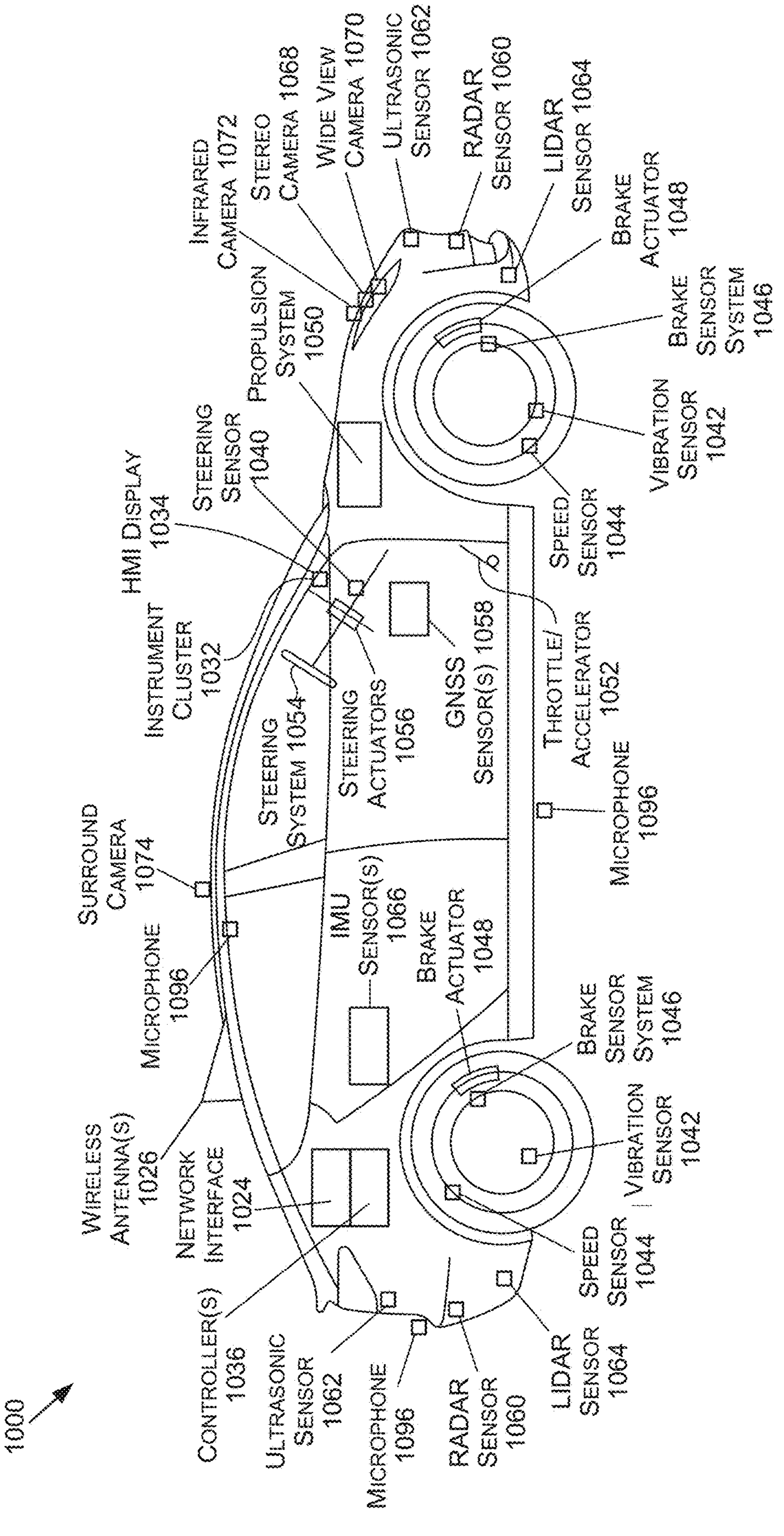
FIG. 10A is an illustration of an example autonomous or semi-autonomous vehicle or machine, in accordance with some embodiments of the present disclosure.
Figure 10B:
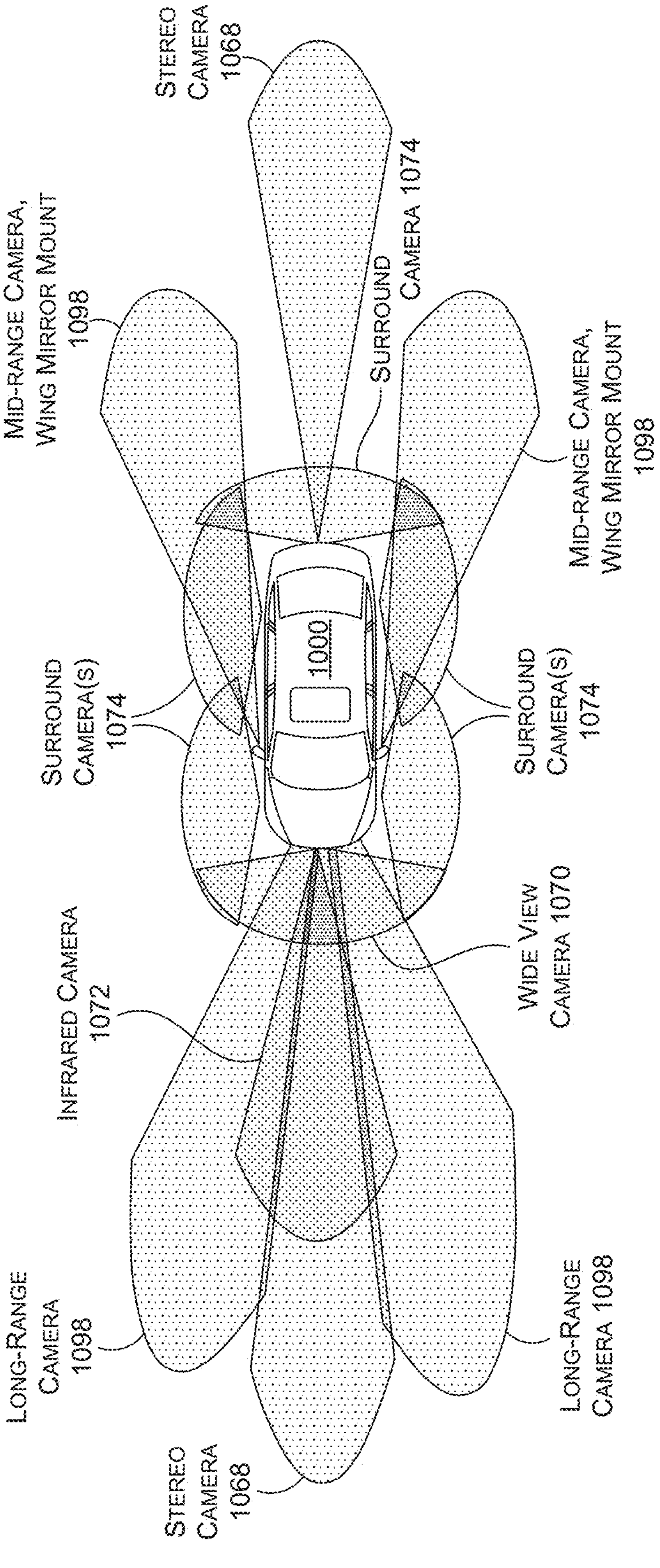
FIG. 10B is an example of camera locations and fields of view for the example autonomous or semi-autonomous vehicle or machine of FIG. 10A, in accordance with some embodiments of the present disclosure.
Figure 10C:
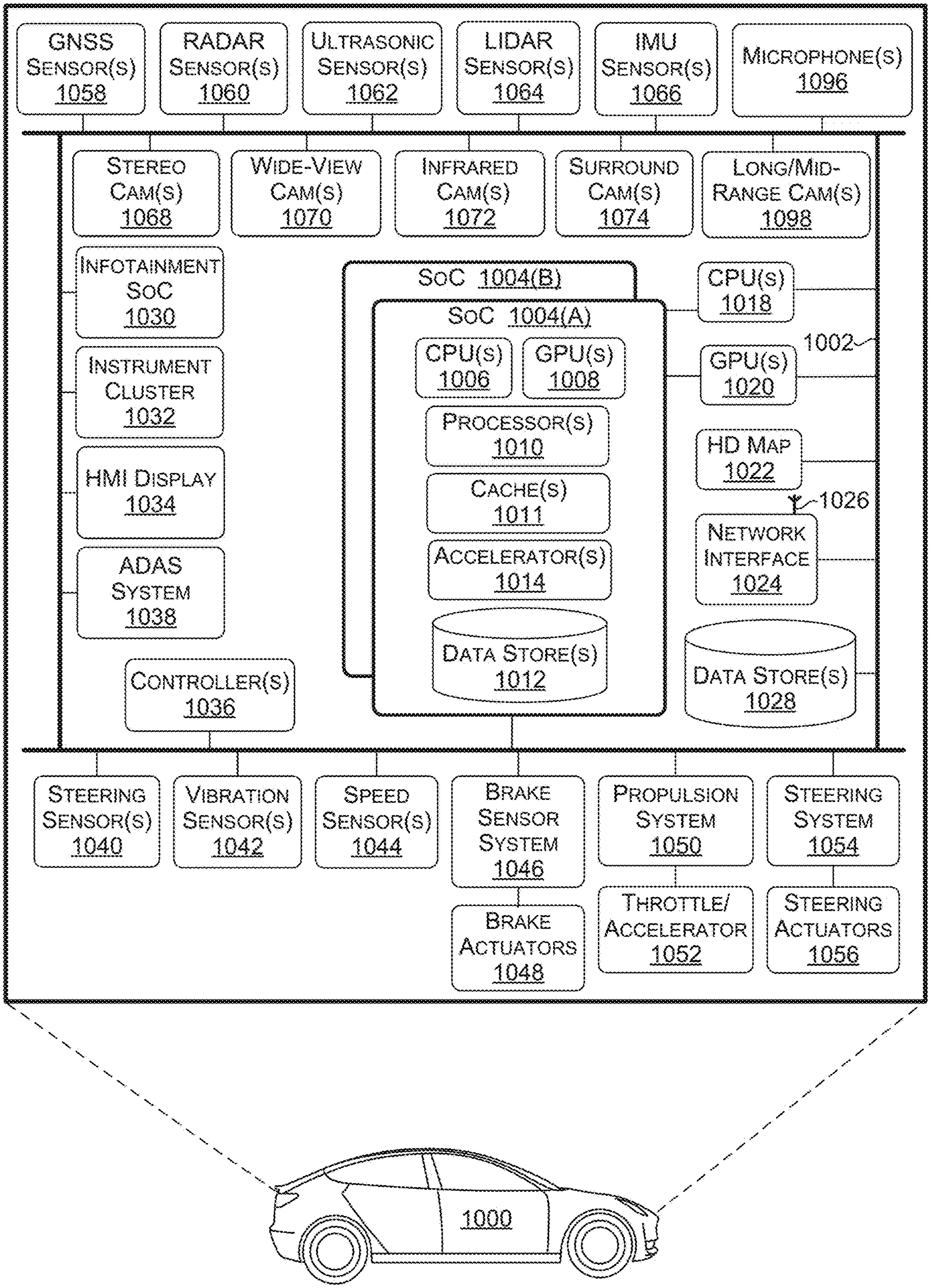
FIG. 10C is a block diagram of an example system architecture for the example autonomous or semi-autonomous vehicle or machine of FIG. 10A, in accordance with some embodiments of the present disclosure.
Figure 10D:
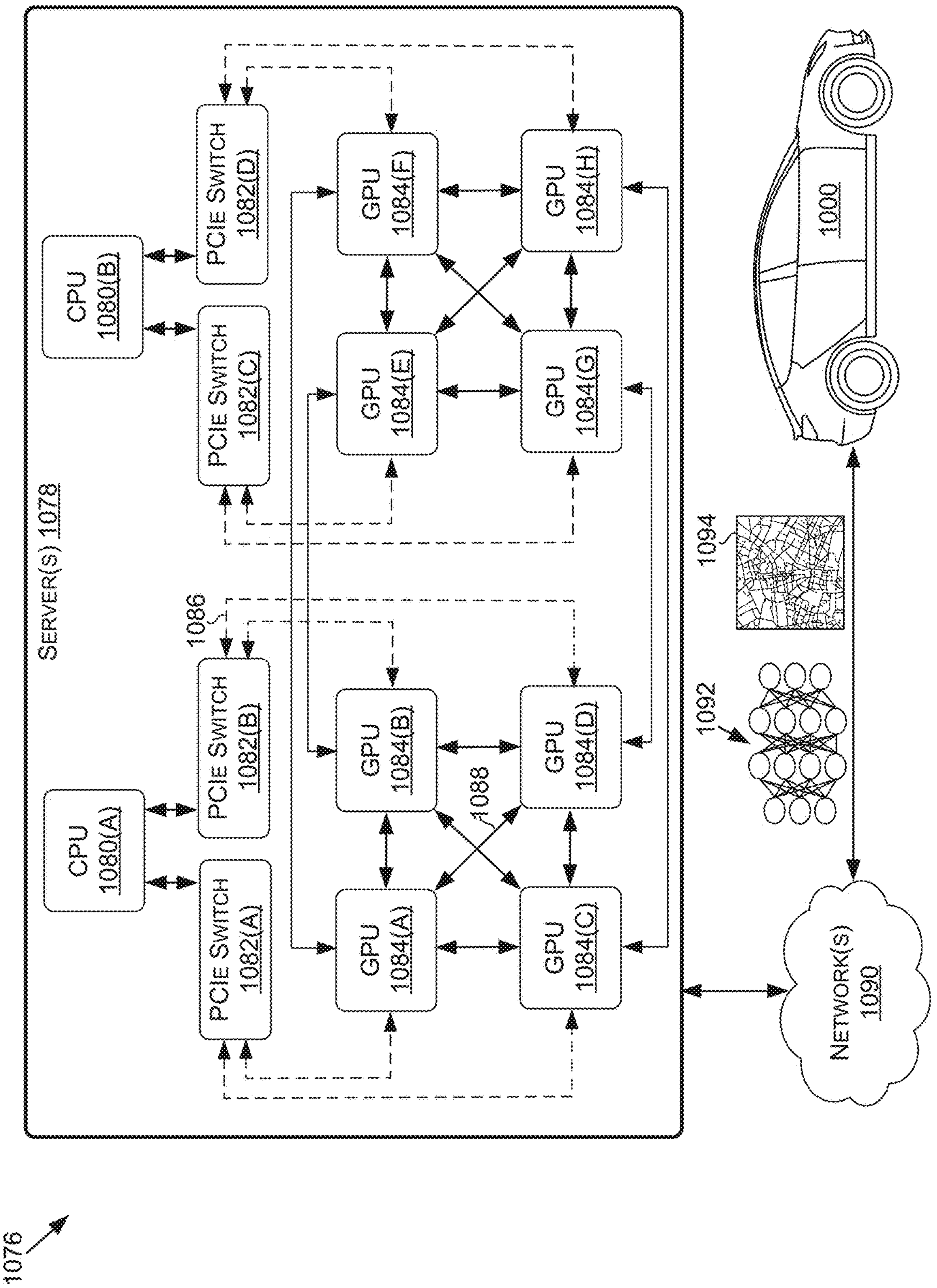
FIG. 10D is a system diagram for communication between cloud-based server(s) and the example autonomous or semi-autonomous vehicle or machine of FIG. 10A, in accordance with some embodiments of the present disclosure.

In some examples, information from the map perceiver may be sent, transmitted, and/or provided to server(s) (e.g., to a map manager of server(s) 1078 of FIG. 10D), and information from the server(s) may be sent, transmitted, and/or provided to the map perceiver and/or a localization manager of the vehicle 1000. The map manager may include a cloud mapping application that is remotely located from the vehicle 1000 and accessible by the vehicle 1000 over one or more network(s). For example, the map perceiver and/or the localization manager of the vehicle 1000 may communicate with the map manager and/or one or more other components or features of the server(s) to inform the map perceiver and/or the localization manager of past and present drives or trips of the vehicle 1000, as well as past and present drives or trips of other vehicles. The map manager may provide mapping outputs (e.g., map data) that may be localized by the localization manager based on a particular location of the vehicle 1000, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1000, etc. The waypoints may be representative of a specific distance into the future for the vehicle 1000, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1000, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on the detected object(s) 115) of the planning component(s) 128 as closely as possible and within the capabilities of the vehicle 1000. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1000 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1000. In some examples, the obstacle avoidance component(s) 132 may be used independently of components, features, and/or functionality of the vehicle 1000 that is required to obey traffic rules and drive courteously. In such examples, the obstacle avoidance component(s) may ignore traffic laws, rules of the road, and courteous driving norms in order to ensure that collisions do not occur between the vehicle 1000 and any objects. As such, the obstacle avoidance layer may be a separate layer from the rules of the road layer, and the obstacle avoidance layer may ensure that the vehicle 1000 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable or other navigable paths and/or the detected object(s) 115 may be used by the obstacle avoidance component(s) 132 in determining controls or actions to take. For example, the drivable paths may provide an indication to the obstacle avoidance component(s) 132 of where the vehicle 1000 may maneuver without striking any objects, protuberances, structures, and/or the like, or at least where no static structures may exist.

Referring back to FIG. 2 and turning now to an example process for training the object detector 108, at a high level, the object detector 108 may be trained by deforming predicted polygons to ground truth polygons into corresponding representations that use a common or comparable structure (e.g., such that predicted and ground truth polygons have a common number of vertices and/or angular offset between vertices) prior to comparison and backpropagation. Depending on the implementation, predicted polygons may be deformed to ground truth polygons, or both may be deformed to have a common or comparable structure.

According to embodiments, any suitable training dataset may be selected based on the desired application. In some embodiments, input training data may be generated from captured sensor data (e.g., sensor data 102 of FIG. 1, such as image data) using the techniques for operating the object detector(s) 108 described above with respect to FIG. 1). Ground truth training data (e.g., ground truth polygon data) may be obtained by annotating data from corresponding sensors 101(*s*). Generally, sensor data (e.g., an image) may be annotated (e.g., manually, automatically, etc.) with labels or other markers identifying the locations, geometry, orientations, and/or classes of instances of the relevant objects in the sensor data. The labels may be generated within a drawing program (e.g., an annotation program), computer aided design (CAD) program, labeling program, another type of suitable program, and/or may be hand drawn, in some examples. The labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). Generally, the labels may comprise bounding polygons, closed polylines, or other bounding shapes drawn, annotated, superimposed, and/or otherwise associated with the sensor data.

As set out above, the classification head 205 of the object detector 108 of FIG. 2 may include any number of channels that each predict a classification data (e.g., a classification map for each channel) representing a likelihood that each pixel or cell belongs to a particular class represented by the channel, and the regression head 207 of the object detector 108 may include any number of channels (e.g., a set corresponding to each supported class) that each regress a different characteristic of regressed polygons representing candidate detected objects of a corresponding class. Generally, the depth-wise vector predicted for each pixel or cell (e.g., for the set of channels associated with a particular class) defines a different candidate polygon (and candidate detected object), forming a set of N candidates 209 (N>>M number of ground truth objects).

To train the object detector 108 to generate these outputs, predicted polygons and/or ground truth polygons may be deformed into a corresponding representation that uses a common or comparable structure (e.g., such that predicted and ground truth polygons have a common number of vertices and/or angular offset between vertices), prior to comparison and backpropagation. The matcher 214 may use any suitable a matching algorithm (e.g., the Hungarian matching algorithm) to match one or more of the N candidates 209 with a corresponding one of the M ground truth polygons 214 resulting in O pairs 212 of predicted—ground truth polygons assignments. Classification and regression losses (such as those described below) from these matches may be used to update the object detector 108. For unmatched candidates, only classification loss may be computed.

Figure 6:
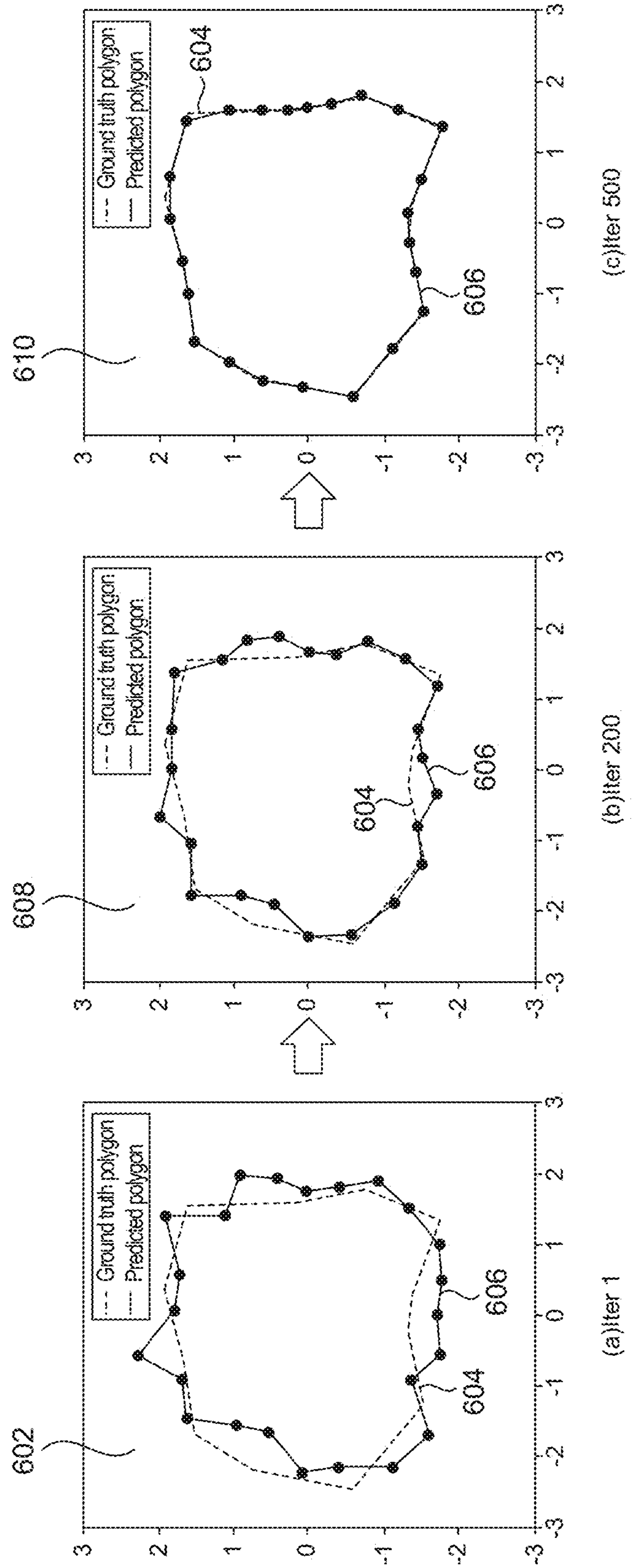
FIG. 6 is an illustration of an example technique for deforming a predicted polygon to a matched ground truth polygon, in accordance with some embodiments of the present disclosure.

Generally, any suitable method or system may be used to deform a predicted polygon to a ground truth polygon (or vice versa). For example, to account for a difference in the number of vertices between a ground truth polygon and a predicted polygon, ground truth and/or predicted polygon vertices may be resampled until both have the same number of vertices and/or the same angular offsets between vectors or rays emanating from their respective origins (e.g., the origin of the ground truth polygon and a regressed origin of a predicted polygon). FIG. 6 is an illustration of an example technique for deforming a predicted polygon 606 to a matched ground truth polygon 604, in accordance with some embodiments of the present disclosure. As illustrated, with each successive resampling iteration 602, 608, 610, the number of vertices and length of a corresponding ray from the origin to each vertex of the predicted polygon 606 approaches those of the matched ground truth polygon 604. In some embodiments, resampling may be performed for as many iterations 602, 608, 610 as desired.

As such, predicted polygons may be resampled to have the same number of vertices and/or with equal spacing between successive vectors or ray-points 408 (see FIG. 4) as corresponding matched ground truth polygons. This resampling operation may be fully differentiable, allowing for gradient back-propagation during training. Using sparse and flexible polygon prediction in this way ensures high-speed runtime inference while dense resampling allows the detection network(s) to learn object shapes with high precision.

For example and referring back to FIG. 3, the resampling step 306 may identify or generate M (e.g., M=180) resampling ray-points for each polygon being deformed. According to some embodiments, M rays may be emitted from the polygon polar origin, and the adjacent ray angle interval may be set at 2π/M. Resampling points may yield intersections between rays and polygon boundary segments defined between successive vertices. Depth distances (e.g., radius lengths) of M ray-points may be used to compute a polygon (intersection over union (IoU) loss. The resampling process may be differentiable. In a backward pass, the gradients of the resampled vectors or ray-points may be chained to the decoded vertices, thereby vertices may be "dragged" to fit to the target shape, as illustrated in FIG. 6. According to some embodiments, ground truth and/or predicted polygons 604, 606 may be resampled to have the same number of points, namely ray-points or vectors. According to some embodiments, this resampling process only happens during training, thus does not hinder inference latency.

In FIG. 6, from iteration step 1 to 200 to 500, the predicted polygon 606 is illustrated as converging close to the target ground truth polygon 604 by iteratively deforming the predicted shape to the target ground truth shape. According to embodiments, given a predicted polygon with k vertices, the predicted polygon may be resampled with m (m>k) vectors or ray-points along equally distributed polar angles. According to one aspect, the resampling process may involve identifying intersections between K boundary segments and M rays. To simplify the computation, it may be assumed that the predicted polygon may be translated to its polar origin at (0, 0). Since rays are uniformly emitted by the angle, the resampling output may only consist of an M dimensional vector(s) $[rd_0, \ldots, rd_{M-1}]$, denoting the relative distance between an intersection point and the polar origin along each vector or ray.

Figure 7A:
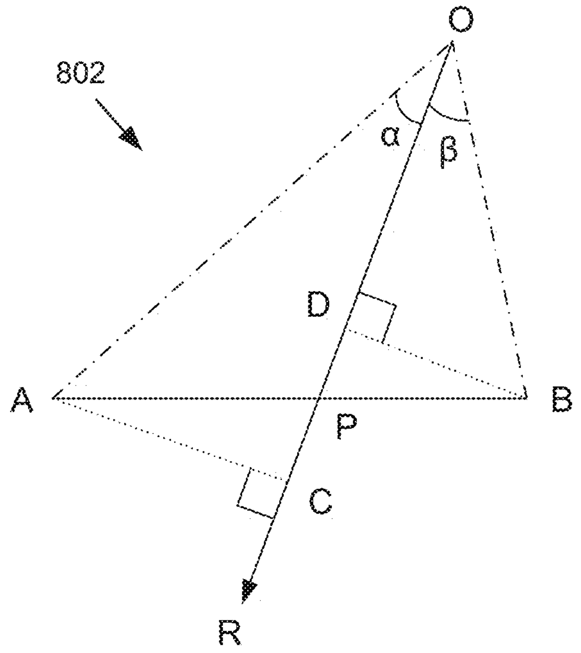
FIGS. 7A and 7B illustrate a triangle approach and a vector approach, respectively, for finding intersections between K boundary segments and M vectors or rays, in accordance with some embodiments of the present disclosure.
Figure 7B:
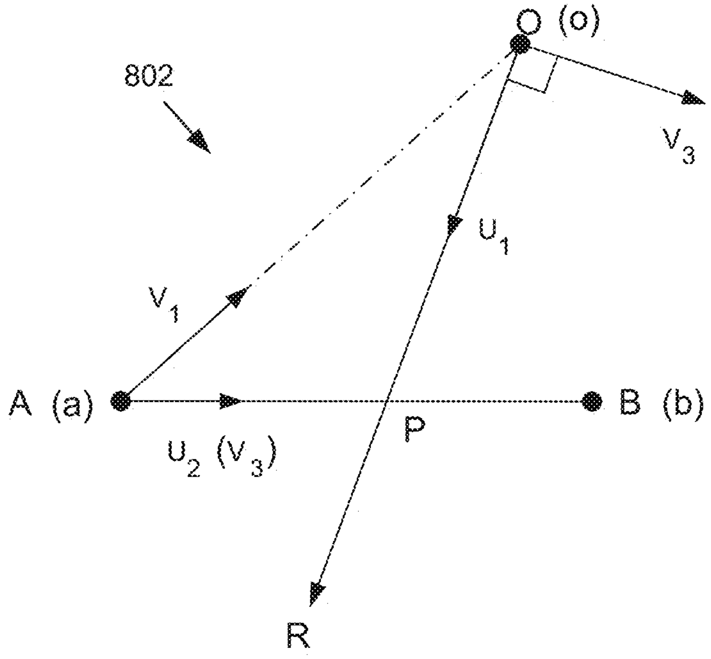

Referring to FIGS. 7A and 7B, as part of the process of training the object detector 108, two example approaches for finding intersections between K boundary segments and M vectors or rays are illustrated. As should be appreciated, these two approaches are non-limiting of other methods that may be used finding intersections between K boundary segments and M rays. FIG. 7A depicts a triangle approach. According to an embodiment, this approach includes finding two adjacent vertices A and B of each vector or ray $O\vec{R}$. Next, based on the triangle similarity, the position of intersection point P within the segment AB may be calculated. In FIG. 7A, let A and B be two adjacent vertices and O be the origin. The task may be to find the intersection point P between segment AB and ray $O\vec{R}$. Deriving from the triangle similarity, a ratio r may be computed as follows:

$$r = \frac{|AP|}{|BP|} = \frac{|AC|}{|BD|} = \frac{|OA|\sin(\alpha)}{|OB|\sin(\beta)}$$

The ratio r represents the position of P within the segment AB. Then, the point P coordinates may be calculated as:

$$(P_x, P_y) = \left(\frac{A_x + B_x}{1 + r}, \frac{A_x + rB_x}{1 + r}\right)$$

The coordinates of O, A, B and their segment lengths may be known from decoding outputs. $O\vec{R}$ is one of the M equal-spaced resampling rays. Once it is determined which ray locates between $O\vec{A}$ and $O\vec{B}$, then the delta angles α and β are also known. The problem is now transformed to finding two neighbor vertices of each ray, which could be solved by searching the ray angle within a sorted list of vertices angles.

FIG. 7B depicts a vector approach. A segment AB and ray $\overrightarrow{OR}$ may be represented in vectors, hence the intersection may be mathematically solved by the dot-product and cross-product of unit vectors (e.g., $\vec{v}1$, $\vec{v}2$, $\vec{v}3$). In FIG. 7B, let $\overrightarrow{u1}$=r−o be the unit vector along ray $\overrightarrow{OR}$, and $\overrightarrow{u2}$=b−a be the unit vector from A to B. The intersection may be determined by solving $t_1$ and $t_2$ from the equation:

$$\begin{cases} f(t_1) = o + \overrightarrow{u_1} * t_1,\ t_1 \in [0, \infty) \\ f(t_2) = a + \overrightarrow{u_2} * t_2,\ t_2 \in [0, 1] \end{cases}$$

where $t_1$ may be constrained as $t_1 \in [0,\infty)$ to ensure the intersection P is along the positive direction of the ray, and $t_2$ may be constrained as $t_2 \in [0, 1]$ to ensure P is at the segment between vertices. The mathematic solution may be given by:

$$\begin{cases} t_1 = \dfrac{|\overrightarrow{v_2} \times \overrightarrow{v_1}|}{\overrightarrow{v_2} \cdot \overrightarrow{v_3}} \\ t_2 = \dfrac{|\overrightarrow{v_1} \times \overrightarrow{v_2}|}{\overrightarrow{v_2} \cdot \overrightarrow{v_3}} \end{cases}$$

where $\overrightarrow{v1}$=o−a is the vector from A to O; $\overrightarrow{v2}$=$\overrightarrow{u2}$=b−a is the vector from A to B; $\overrightarrow{v3}$ is the vector perpendicular to ray vector $\overrightarrow{u1}$. Suppose $\overrightarrow{u1}$ is decomposed into $[u_{1x}, u_{1y}]$, then $\overrightarrow{v3}=[-u_{1y}, u_{1x}]$. The operator · is the dot-product and x is the cross-product.

According to an embodiment, the triangle approach assumes vertices have been ordered ascendingly. As such, in some embodiments, predicted angles may be encoded and/or decoded in counterclockwise order, which naturally satisfies the assumption. However, for some ground truth encodings, this assumption is not guaranteed for concave shapes. Therefore, the triangle approach may be used for prediction decoding. On the other hand, the vector approach has no requirements on the vertex order, and it works for both convex and concave shapes, so the vector approach may be used in either or both scenarios.

According to some embodiments, training the object detector 108 includes measuring or determining loss between a regressed predicted polygon and a corresponding ground truth polygon. One way to measure the loss between two shapes is based on their intersection-over-union (IoU). According to embodiments, the polar representation described herein and the above resampling techniques makes computing losses between ground truth and prediction polygons easier and more efficient. Referring back to FIGS. 2 and 3, once predicted and ground truth polygons have been matched and/or deformed, the predicted and ground truth polygons may be compared and one or more losses may be used to update the object detector 108. For example, a polygon shape regression loss $L_{reg}$ may be formulated as a combination (e.g., a weighted sum) of polar origin loss $L_{ori}$ which may penalize the object center position shifts, ray IoU loss $L_{iou}$ which may penalize the difference in the polygon shape, smoothness loss $L_{sm}$ which may penalize difference in smoothness, and/or others:

$$\mathcal{L}_{reg} = w_1\mathcal{L}_{ori} + w_2\mathcal{L}_{iou} + w_3\mathcal{L}_{sm}$$

According to some embodiments, the polar origin loss $L_{ori}$ is used to optimize the location offsets. For example, smooth-L1 loss may be employed for the absolute distance error. The present systems and methods may breakdown the smooth-L1 distance along width and height, and normalize by ground truth sizes $\hat{w}$ and $\hat{h}$. This is intended to avoid having predictions in the denominator and stabilize the gradient computation. Formally:

$$\mathcal{L}_{ori} = \frac{smoothL1(o_x, \hat{o}_x)}{\hat{w}} + \frac{smoothL1(o_y, \hat{o}_y)}{\hat{h}}$$

The Ray IoU loss $L_{iou}$ may be used to optimize the polygon shape, from the perspective of dense resampled ray-points. The pairwise ray min and max may be accumulated to approximate the intersection and union area of two masks/shapes, and an inversed log scale may be applied in the loss function.

$$\mathcal{L}_{iou} = \log\frac{\sum_{i=0}^{M-1}\max(rd_i, \hat{rd}_i)}{\sum_{i=0}^{M-1}\min(rd_i, \hat{rd}_i)}$$

The smoothness loss may be added to reduce the vertices oscillation. The mean absolute error may be minimized for every two adjacent ray depths, in their first order ($rd_i$) and $2^{nd}$ order ($rd'_i$) differences.

$$\mathcal{L}_{sm} = \frac{\sum_{i=0}^{M-1}(rd_i, rd_{i-1})}{M-1} + \frac{\sum_{i=0}^{M-1}(rd'_i, rd'_{i-1})}{M-1}$$

Figure 8:
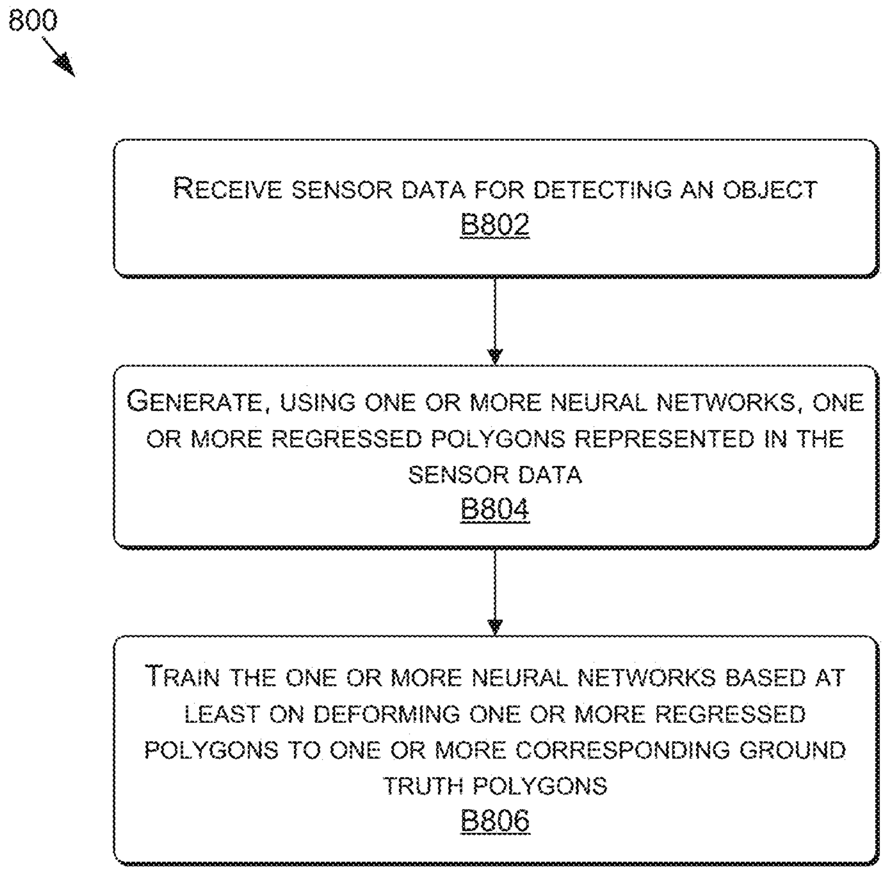
FIG. 8 is a data flow diagram illustrating an example process for training a deformable polygon process for object detection using polygon regression, in accordance with some embodiments of the present disclosure.

Now referring to FIG. 8, each block of method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the method 800 may be described, by way of example, with respect to the object detection system of FIG. 1. However, this method may additionally or alternatively be executed by any one system, or any combination of systems, including, but not limited to, those described herein.

FIG. 8 is a data flow diagram illustrating an example process for training the object detector 108 for object detection using polygon regression in accordance with some embodiments of the present disclosure as described above. According to some embodiments, the method 800, at block B802, includes receiving sensor data for detecting an object.

For example, as described above with reference to FIG. 1, the sensor data 102 (e.g., an image) may be captured using one or more sensor(s) 101 (e.g., a camera), and the sensor data 102 (e.g., the image) may be used as the input data 106 into the object detector 108.

The method 800, at block B804, includes generating, using one or more neural networks, one or more regressed polygons represented in the sensor data. For example, as described above with reference to FIG. 2, the object detector 108 may include, without limitation, a feature extractor (e.g., a DNN, an encoder/decoder, etc.) including convolutional layers, pooling layers, and/or other layer types, where the output of the feature extractor may be provided as input to the classification head 205 for predicting classification data representing one or more classifications in a scene and the regression head 207 for predicting regression data representing, for each regressed polygon of one or more regressed polygons representing one or more shapes of one or more detected objects represented by the one or more classifications in the scene, at least a regressed angle between vertices of the regressed polygon.

The method 800, at block B806, includes training the one or more neural networks based at least on deforming the one or more regressed polygons to one or more corresponding ground truth polygons. For example, with respect to FIG. 3, resampling 306 may be applied to (e.g., such that the one or more regressed polygons so they have a same number of vertices as, a same vector length from an origin to each vertex of one or more of the vertices, a same angular offset between successive vertices as the candidate ground truth polygon, and/or other characteristics as a corresponding ground truth polygon. Training the one or more neural networks may also be based at least on matching at least one of the one or more regressed polygons with a candidate ground truth polygon using a Hungarian algorithm.

Figure 9:
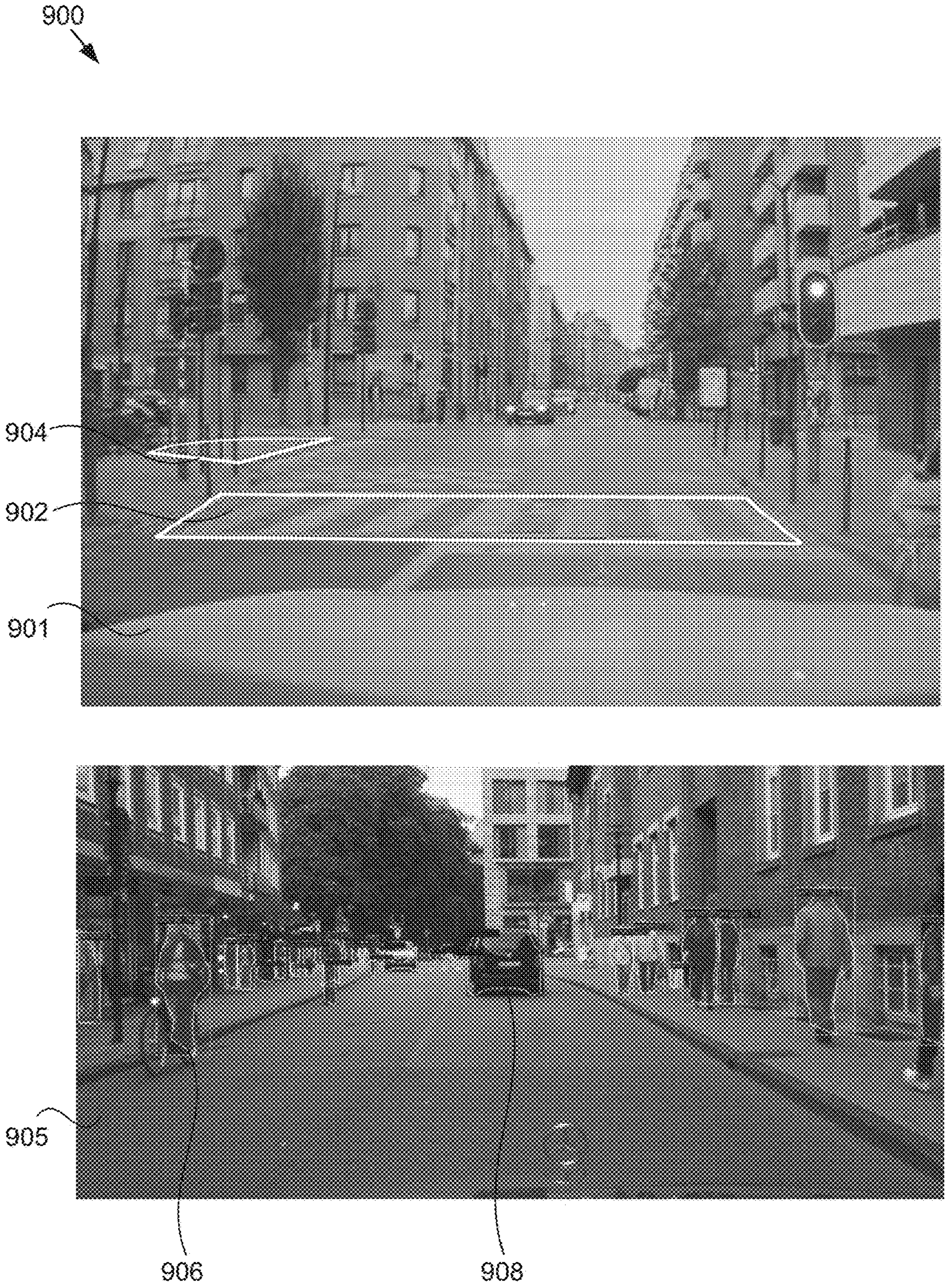
FIG. 9 illustrates a number of objects detected via a process for object detection using polygon regression, in accordance with some embodiments of the present disclosure.

FIG. 9 illustrates a number of objects detected via a process for object detection using polygon regression, in accordance with some embodiments of the present disclosure as described herein. By way of non-limiting examples, street scenes 901 and 905 are illustrated in FIG. 9. In the upper scene 901, a crosswalk 902 and a crosswalk 904 have been detected using one or more regressed polygons as described herein. As illustrated in the upper scene 901, the shapes of the regressed polygons are not simple rectangular boxes as may be generated by prior methods and systems that would less-than-accurately bound the example crosswalks, but the shapes are regressed non-rectangular polygons (e.g., trapezoidal-like shapes) that fit the actual objects (e.g., crosswalks) more accurately than would simple rectangular bounding boxes. In the lower scene 905, people 906 and a car 908 have been detected. In similar fashion as the crosswalks in the upper scene, rather than detect the objects 906, 908 with simple rectangular bounding boxes, regressed polygons are determined that provide a significantly better object detection than would simple rectangular bounding boxes of prior methods and systems.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models—such as large language models (LLMs) that process textual, image, sensor, audio, and/or other data types to generate outputs, systems for performing light transport simulation, systems for performing collaborative content creation for 3D assets, systems implemented at least partially using cloud computing resources, and/or other types of systems.

FIG. 10A is an illustration of an example autonomous or semi-autonomous vehicle or machine 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree Cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the High Definition ("HD") map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1022 which may use one or more wireless antenna(s) 1026 and/or modem(s) to communicate over one or more networks. For example, the network interface 1022 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree Camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1022 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), and very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline. The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1022 which may include one or more wireless antennas 1026 (e.g., one or more wireless antennas for different communication protocols, such as a cellular antenna, a Bluetooth antenna, etc.). The network interface 1022 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1022 may include a SoC that provides modulation and demodulation functionality and enables the controller(s) 1036 to communicate over wireless networks. The network interface 1022 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle. Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree Field of view. Commercially available LIDAR sensor(s) 1064 may have an advertised range of approximately 1000 m, with an accuracy of 2 cm–3 cm, and with support for a 1200 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC.

Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1022 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 1000), while the 12V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 11:
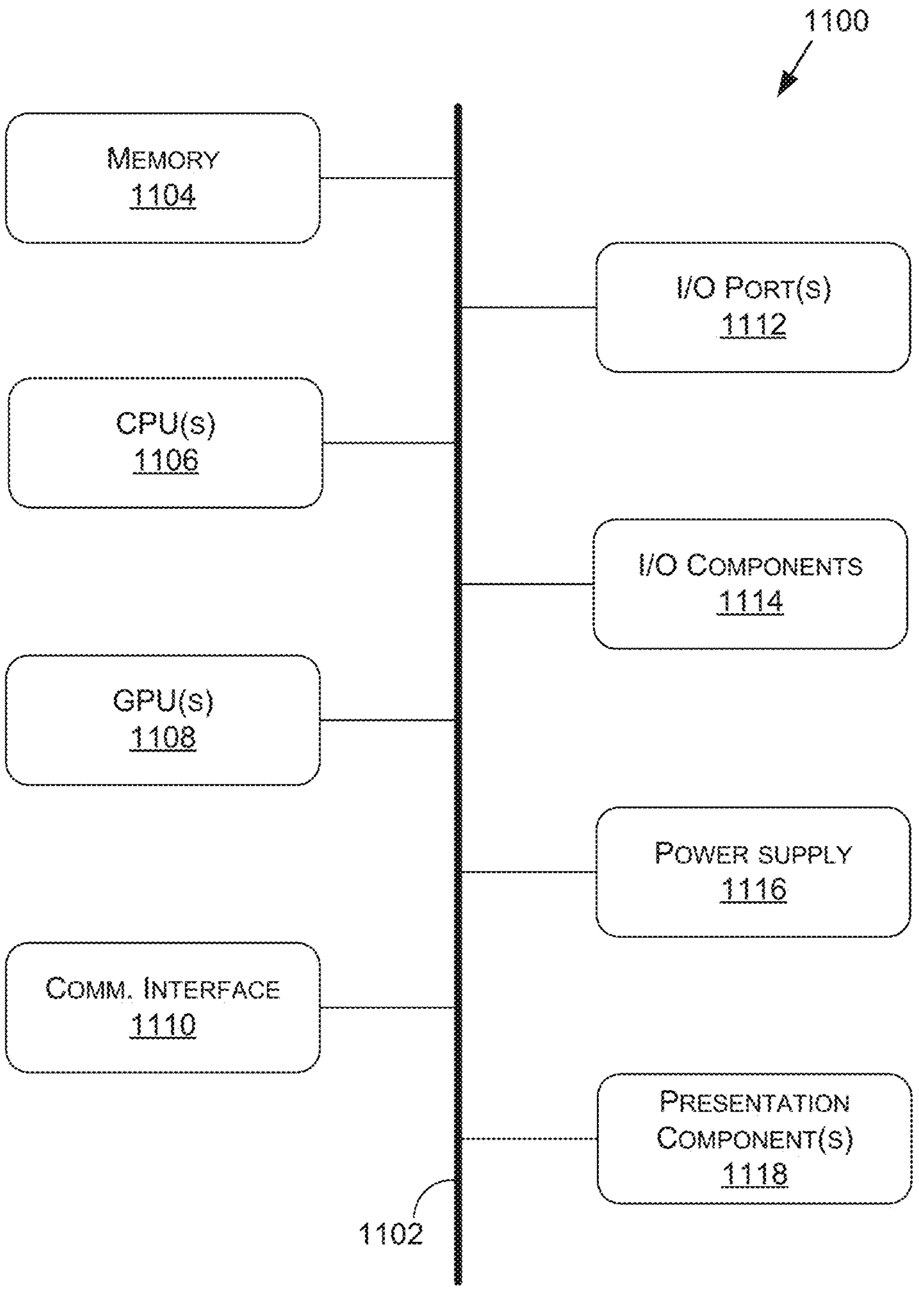
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Figure 12:
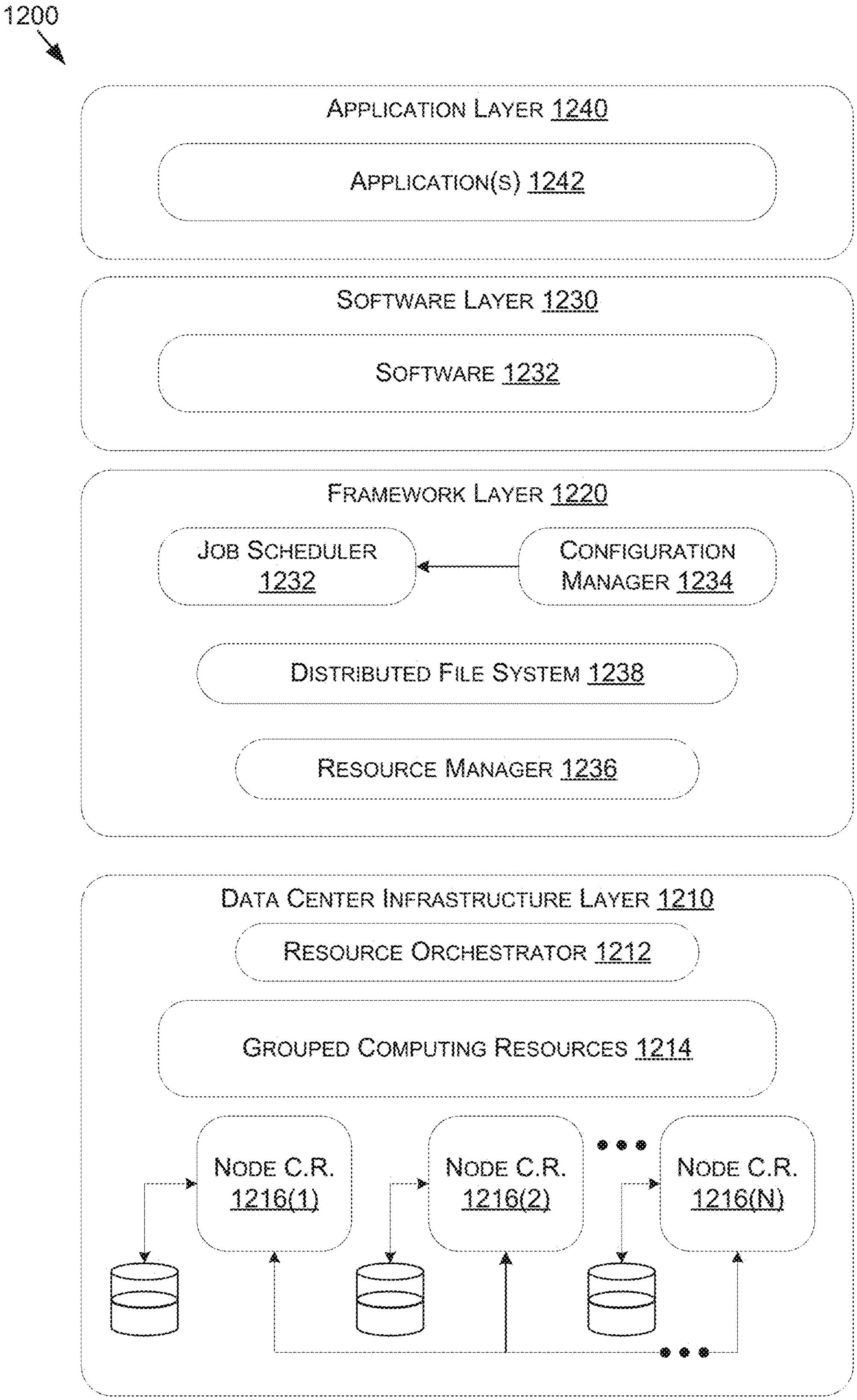
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240. As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:

one or more circuits to:

determine, using one or more neural networks and based at least on sensor data corresponding to a scene, regression data representing, for at least one regressed polygon corresponding to one or more shapes of one or more detected objects, at least a regressed angle between vertices of the at least one regressed polygon;

generate, based at least in part on the regression data, one or more bounding shapes of the one or more detected objects in the scene; and perform one or more operations based at least on the one or more bounding shapes.

2. The processor of claim 1, wherein the regression data further represents different regressed angles between different pairs of successive vertices of the at least one regressed polygon.

3. The processor of claim 1, wherein the one or more circuits are further to determine the regressed angle as an angular offset from a regressed origin of the at least one regressed polygon, the regressed origin being a geometric center of the at least one regressed polygon located at a regressed offset from a corresponding cell of the regression data representing the at least one regressed polygon.

4. The processor of claim 1, wherein the one or more circuits are further to generate the one or more bounding shapes based at least on selecting a cell of classification data representing or more classifications in the scene, the cell of classification data having a threshold classification value and generating a bounding shape of the one or more bounding shapes based at least on a depth-wise vector associated with a corresponding cell of the regression data.

5. The processor of claim 1, wherein the regression data further represents at least a regressed length of a vector of one or more vectors from a regressed geometric center of the at least one regressed polygon to a corresponding one of the vertices.

6. The processor of claim 1, wherein the one or more neural networks are trained based at least on deforming regressed polygons during training to have a same number of vertices as candidate ground truth polygons.

7. The processor of claim 1, wherein the one or more neural networks are trained based at least on deforming regressed polygons during training to have a same angular offset between successive vertices as candidate ground truth polygons.

8. The processor of claim 1, wherein the one or more neural networks are trained based at least on deforming regressed polygons during training to have a same vector length from origin to each vertex of one or more of the vertices as candidate ground truth polygons.

9. The processor of claim 1, wherein the one or more neural networks are trained based at least on matching regressed polygons during training with candidate ground truth polygons using a Hungarian algorithm.

10. The processor of claim 1, wherein the one or more detected objects represented by one or more classifications in the scene correspond to one or more of a feature, a dynamic object, a static object, a crosswalk, a lane marking, a road boundary marking, a road marking, a sign, a traffic light, a vehicle, a pedestrian, a cyclist, or a robot.

11. The processor of claim 1, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

12. A method comprising:

determining, using one or more neural networks and based at least on sensor data corresponding to a scene, classification data representing one or more classifications in the scene;

determining, using the one or more neural networks, regression data representing, for at least one regressed polygon corresponding to one or more shapes of one or more detected objects indicated by the one or more classifications in the scene, different regressed angles between different pairs of successive vertices of the at least one regressed polygon;

generating, based at least in part on the regression data, one or more bounding shapes of the one or more detected objects in the scene; and performing one or more operations based at least on the one or more bounding shapes.

13. The method of claim 12, further comprising determining the different regressed angles as angular offsets from a regressed origin of the at least one regressed polygon, the regressed origin being a geometric center of the at least one regressed polygon located at a regressed offset from a corresponding cell of the regression data representing the at least one regressed polygon.

14. The method of claim 12, further comprising generating the one or more bounding shapes based at least on selecting a cell of the classification data having a threshold classification value and generating a bounding shape of the one or more bounding shapes based at least on a depth-wise vector associated with a corresponding cell of the regression data.

15. The method of claim 12, wherein the one or more neural networks are trained based at least on deforming regressed polygons during training to have a same number of vertices as candidate ground truth polygons.

16. The method of claim 12, wherein the one or more neural networks are trained based at least on deforming regressed polygons during training to have: a same vector length from origin to each vertex of one or more vertices as candidate ground truth polygons, and a same angular offset between vertices as the candidate ground truth polygons.

17. The method of claim 12, wherein the one or more neural networks are trained based at least on matching regressed polygons with candidate ground truth polygons using a Hungarian algorithm.

18. The method of claim 12, wherein the one or more detected objects in the scene correspond to one or more of a feature, a dynamic object, a static object, a crosswalk, a lane marking, a road boundary marking, a road marking, a sign, a traffic light, a vehicle, a pedestrian, a cyclist, or a robot.

19. The method of claim 12, wherein the method is executed using at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for presenting at least one of augmented reality content, virtual reality content, or mixed reality content;

a system for hosting one or more real-time streaming applications;

a system implemented using an edge device;

a system implemented using a robot;

a system for performing conversational AI operations;

a system implementing one or more large language models (LLMs);

a system for generating synthetic data;

a system incorporating one or more virtual machines (VMs);

a system implemented at least partially in a data center; or a system implemented at least partially using cloud computing resources.

20. A system comprising:

one or more processing units to cause performance of one or more operations associated with a machine based at least on one or more regressed polygons corresponding to one or more detected objects in a scene, the one or more regressed polygons determined based at least on one or more regressed angles between one or more vertices of the one or more regressed polygons as computed using one or more machine learning models.

* * * * *